(12) United States Patent
Milener et al.

(10) Patent No.: US 8,959,630 B2
(45) Date of Patent: *Feb. 17, 2015

(54) ENHANCED BROWSING WITH SECURITY SCANNING

(71) Applicant: BT Web Solutions, LLC, Wilmington, DE (US)

(72) Inventors: Scott Milener, San Francisco, CA (US); Wendell Brown, Las Vegas, NV (US); James Kelly, San Francisco, CA (US)

(73) Assignee: BT Web Solutions, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/659,981

(22) Filed: Oct. 25, 2012

(65) Prior Publication Data

US 2013/0055395 A1  Feb. 28, 2013

Related U.S. Application Data

(60) Continuation of application No. 13/237,641, filed on Sep. 20, 2011, now Pat. No. 8,327,440, which is a division of application No. 11/264,418, filed on Nov. 1, 2005, now Pat. No. 8,037,527, which is a continuation-in-part of application No. 10/985,700, filed on Nov. 10, 2004, now abandoned.

(60) Provisional application No. 60/625,891, filed on Nov. 8, 2004.

(51) Int. Cl.
*G06F 11/00* (2006.01)

(52) U.S. Cl.
USPC .................. 726/22; 726/23; 726/24; 726/25; 713/188

(58) Field of Classification Search
USPC ........... 726/22, 23, 24, 25; 713/188; 709/204; 715/738, 804, 805, 822
See application file for complete search history.

(56) References Cited

U.S. PATENT DOCUMENTS

| | | | |
|---|---|---|---|
| 5,307,086 A | 4/1994 | Griffin et al. |
| 5,495,566 A | 2/1996 | Kwatinetz |
| 5,659,693 A | 8/1997 | Hansen et al. |
| 5,664,948 A | 9/1997 | Dimitriadis et al. |
| 5,680,562 A | 10/1997 | Conrad et al. |
| 5,715,445 A | 2/1998 | Wolfe |
| 5,781,909 A | 7/1998 | Logan et al. |
| 5,796,967 A | 8/1998 | Filepp et al. |

(Continued)

FOREIGN PATENT DOCUMENTS

WO  0190912 A  11/2001

OTHER PUBLICATIONS

Alexa Snapshot, Alexa Toolbar; 8 pages printed Jan. 31, 2005 from http://www.alexa.com.

(Continued)

*Primary Examiner* — Baotran N To

(57) ABSTRACT

A method scans a second web page linked to a first web page being displayed by a browser in a browser window. The method identifies, in the first web page, a target link to the second web page. Prior to receiving a user selection of the target link, the method prefetches content from the second web page and loads it into a safe cache according to a prefetching order before receiving the user selection of the target link and before the content of the second web page is opened by an application configured to provide access to the content of the second web page. The method scans the prefetched content from the second web page for a security threat, within the safe cache, which is configured to prevent the prefetched content from altering a memory location or storage location external to the safe cache.

20 Claims, 10 Drawing Sheets

(56) References Cited

U.S. PATENT DOCUMENTS

| | | |
|---|---|---|
| 5,805,815 A | 9/1998 | Hill |
| 5,872,922 A | 2/1999 | Hogan et al. |
| 5,877,746 A | 3/1999 | Parks et al. |
| 5,880,733 A | 3/1999 | Horvitz et al. |
| 5,890,172 A | 3/1999 | Borman et al. |
| 5,946,682 A | 8/1999 | Wolfe |
| 5,963,952 A | 10/1999 | Smith |
| 5,973,688 A | 10/1999 | May |
| 5,978,847 A | 11/1999 | Kisor et al. |
| 5,987,466 A | 11/1999 | Greer et al. |
| 5,991,713 A | 11/1999 | Unger et al. |
| 5,991,740 A | 11/1999 | Messer |
| 6,011,537 A | 1/2000 | Slotznick |
| 6,025,844 A | 2/2000 | Parsons |
| 6,035,330 A | 3/2000 | Astiz et al. |
| 6,067,565 A | 5/2000 | Horvitz |
| 6,085,226 A | 7/2000 | Horvitz |
| 6,088,803 A | 7/2000 | Tso et al. |
| 6,128,655 A | 10/2000 | Fields et al. |
| 6,182,072 B1 | 1/2001 | Leak et al. |
| 6,182,133 B1 | 1/2001 | Horvitz |
| 6,199,098 B1 | 3/2001 | Jones et al. |
| 6,208,354 B1 | 3/2001 | Porter |
| 6,222,541 B1 | 4/2001 | Bates et al. |
| 6,230,168 B1 | 5/2001 | Unger et al. |
| 6,243,091 B1 | 6/2001 | Berstis |
| 6,256,028 B1 | 7/2001 | Sanford et al. |
| 6,262,724 B1 | 7/2001 | Crow et al. |
| 6,301,576 B1 | 10/2001 | Wolfe |
| 6,317,791 B1 | 11/2001 | Cohn et al. |
| 6,356,908 B1 | 3/2002 | Brown et al. |
| 6,421,733 B1 | 7/2002 | Tso et al. |
| 6,441,834 B1 | 8/2002 | Agassi et al. |
| 6,448,986 B1 | 9/2002 | Smith |
| 6,496,208 B1 | 12/2002 | Bernhardt et al. |
| 6,549,218 B1 | 4/2003 | Gershony et al. |
| 6,584,498 B2 | 6/2003 | Nguyen |
| 6,604,103 B1 | 8/2003 | Wolfe |
| 6,651,044 B1 | 11/2003 | Stoneman |
| 6,667,751 B1 | 12/2003 | Wynn et al. |
| 6,675,159 B1 | 1/2004 | Lin et al. |
| 6,675,202 B1 | 1/2004 | Perttunen |
| 6,678,793 B1 | 1/2004 | Doyle |
| 6,741,188 B1 | 5/2004 | Miller et al. |
| 6,763,334 B1 | 7/2004 | Matsumoto et al. |
| 6,785,732 B1 * | 8/2004 | Bates et al. ............ 709/232 |
| 6,874,126 B1 | 3/2005 | Lapidous |
| 7,007,237 B1 | 2/2006 | Sharpe |
| 7,047,033 B2 | 5/2006 | Wyler |
| 7,047,502 B2 | 5/2006 | Petropoulos et al. |
| 7,051,029 B1 | 5/2006 | Fayyad et al. |
| 7,117,443 B1 | 10/2006 | Zilka et al. |
| 7,162,493 B2 | 1/2007 | Weiss et al. |
| 7,167,875 B2 | 1/2007 | Brown et al. |
| 7,296,230 B2 | 11/2007 | Fukatsu et al. |
| 7,429,993 B2 | 9/2008 | Hui |
| 7,506,260 B2 | 3/2009 | Wada et al. |
| 7,640,361 B1 * | 12/2009 | Green et al. ............ 709/246 |
| 7,647,550 B1 | 1/2010 | Nguyen |
| 7,765,143 B1 | 7/2010 | West |
| 7,774,799 B1 | 8/2010 | Sellers et al. |
| 7,792,925 B1 | 9/2010 | Werner et al. |
| 2001/0003194 A1 | 6/2001 | Shimura et al. |
| 2001/0016845 A1 | 8/2001 | Tribbensee |
| 2001/0029538 A1 | 10/2001 | Blockton et al. |
| 2001/0037314 A1 | 11/2001 | Ishikawa |
| 2001/0040584 A1 | 11/2001 | Deleeuw |
| 2001/0047375 A1 | 11/2001 | Fest |
| 2001/0050658 A1 | 12/2001 | Adams |
| 2002/0010757 A1 | 1/2002 | Granik et al. |
| 2002/0030697 A1 | 3/2002 | Oikawa |
| 2002/0032699 A1 | 3/2002 | Edwards et al. |
| 2002/0057299 A1 | 5/2002 | Oren et al. |
| 2002/0059166 A1 | 5/2002 | Wang et al. |
| 2002/0080170 A1 | 6/2002 | Goldberg et al. |
| 2002/0091739 A1 | 7/2002 | Ferlitsch et al. |
| 2002/0094868 A1 | 7/2002 | Tuck et al. |
| 2002/0107884 A1 | 8/2002 | Banerjee et al. |
| 2002/0124022 A1 | 9/2002 | Yoo |
| 2002/0126155 A1 | 9/2002 | Lin-Hendel |
| 2002/0135617 A1 | 9/2002 | Samid |
| 2002/0143826 A1 | 10/2002 | Day et al. |
| 2002/0147779 A1 | 10/2002 | Bates et al. |
| 2002/0147788 A1 | 10/2002 | Nguyen |
| 2002/0163545 A1 | 11/2002 | Hii |
| 2002/0165925 A1 | 11/2002 | Hamilton et al. |
| 2002/0169828 A1 | 11/2002 | Blanchard |
| 2002/0182578 A1 | 12/2002 | Rachman et al. |
| 2002/0186249 A1 | 12/2002 | Lu et al. |
| 2002/0192623 A1 | 12/2002 | Sather et al. |
| 2003/0009495 A1 | 1/2003 | Adjaoute |
| 2003/0014415 A1 | 1/2003 | Weiss et al. |
| 2003/0023582 A1 | 1/2003 | Bates et al. |
| 2003/0043193 A1 | 3/2003 | Alegria et al. |
| 2003/0080995 A1 | 5/2003 | Tenenbaum et al. |
| 2003/0090510 A1 | 5/2003 | Shuping et al. |
| 2003/0110272 A1 | 6/2003 | Du Castel et al. |
| 2003/0146939 A1 | 8/2003 | Petropoulos et al. |
| 2003/0163372 A1 | 8/2003 | Kolsy |
| 2003/0163454 A1 | 8/2003 | Jacobsen et al. |
| 2004/0006609 A1 | 1/2004 | Skrepetos |
| 2004/0024640 A1 | 2/2004 | Engle et al. |
| 2004/0044571 A1 | 3/2004 | Bronnimann et al. |
| 2004/0049541 A1 | 3/2004 | Swahn |
| 2004/0054968 A1 | 3/2004 | Savage |
| 2004/0064471 A1 | 4/2004 | Brown et al. |
| 2004/0093562 A1 | 5/2004 | Diorio et al. |
| 2004/0125149 A1 | 7/2004 | Lapidous |
| 2004/0141016 A1 | 7/2004 | Fukatsu et al. |
| 2004/0158799 A1 | 8/2004 | Breuel |
| 2004/0167928 A1 | 8/2004 | Anderson et al. |
| 2004/0168121 A1 | 8/2004 | Matz |
| 2004/0189695 A1 | 9/2004 | Kurtz et al. |
| 2004/0189696 A1 | 9/2004 | Shirriff |
| 2004/0205514 A1 * | 10/2004 | Sommerer et al. ......... 715/501.1 |
| 2004/0205633 A1 | 10/2004 | Martinez et al. |
| 2004/0250219 A1 | 12/2004 | Sawada |
| 2005/0004844 A1 | 1/2005 | Attia |
| 2005/0021851 A1 | 1/2005 | Hamynen |
| 2005/0022013 A1 | 1/2005 | Schwenk |
| 2005/0050443 A1 | 3/2005 | Sachedina et al. |
| 2005/0055426 A1 | 3/2005 | Smith et al. |
| 2005/0055632 A1 | 3/2005 | Schwartz et al. |
| 2005/0055644 A1 | 3/2005 | Stockton |
| 2005/0086109 A1 | 4/2005 | Mcfadden et al. |
| 2005/0086612 A1 | 4/2005 | Gettman et al. |
| 2005/0097438 A1 | 5/2005 | Jacobson |
| 2005/0119935 A1 | 6/2005 | Boss et al. |
| 2005/0138143 A1 | 6/2005 | Thompson |
| 2005/0149726 A1 | 7/2005 | Joshi et al. |
| 2005/0149874 A1 | 7/2005 | Kokko et al. |
| 2005/0198587 A1 | 9/2005 | Pennell et al. |
| 2005/0216856 A1 | 9/2005 | Matti |
| 2005/0235203 A1 | 10/2005 | Undasan |
| 2006/0020904 A1 | 1/2006 | Aaltonen et al. |
| 2006/0047634 A1 | 3/2006 | Aaron et al. |
| 2006/0053224 A1 | 3/2006 | Subramaniam |
| 2006/0069617 A1 | 3/2006 | Milener et al. |
| 2006/0069618 A1 | 3/2006 | Milener et al. |
| 2006/0069996 A1 | 3/2006 | Greaves |
| 2006/0070012 A1 | 3/2006 | Milener et al. |
| 2006/0074984 A1 | 4/2006 | Milener et al. |
| 2006/0101341 A1 | 5/2006 | Kelly et al. |
| 2006/0101514 A1 | 5/2006 | Milener et al. |
| 2006/0143568 A1 | 6/2006 | Milener et al. |
| 2006/0277478 A1 | 12/2006 | Seraji et al. |

OTHER PUBLICATIONS

Answwwer Search Robot; 2 pages printed Jan. 31, 2005 from http://www.answwwer.net.

Int'l Search Report and Written Opinion of the Int'l Search Authority for Int'l Appl. No. PCT/US2005/034852 (total of 9 pages).

(56) References Cited

OTHER PUBLICATIONS

Wikipedia, "PHP programming language", http://www.wikipedia.org/wiki/PHP, http://web.archive.org/web/20030304011841/www.wikipedia.org/wiki/PHP, Mar. 4, 2003, printout pp. 1-2.

LostGoggles, 9 pages printed Jan. 31, 2005 from http://www.lostgoggles.com.

MicroSurfer, 5 pages printed Jan. 31, 2005 from http://www.microsurfer.com.

Surfie!, 16 pages printed Jan. 31, 2005 from http://www.speed-system.co.jp/en.

UCmore, 8 pages printed Jan. 31, 2005 from http://www.ucmore.com.

Viewpoint Toolbar; 3 pages printed Jan. 31, 2005 from http://www.viewpoint.com.

W3Schools, "JavaScript Tutorial", http://www.w3schools.com/js/default.asp, http://webarchive.org/web/20021013180557/www.w3schools.com/js/default.asp, Oct. 13, 2002, printout pp. 1-3.

\* cited by examiner

ENHANCED BROWSING WITH SECURITY SCANNING

RELATED APPLICATIONS

This application is a continuation of U.S. patent application Ser. No. 13/237,641, filed Sep. 20, 2011, now U.S. Pat. No. 8,327,440, which is a divisional of U.S. patent application Ser. No. 11/264,418, filed Nov. 1, 2005, now U.S. Pat. No. 8,037,527, which (1) is a continuation-in-part of U.S. patent application Ser. No. 10/985,700, filed Nov. 10, 2004, now abandoned, and (2) claims priority to U.S. Provisional Patent Application No. 60/625,891, filed Nov. 8, 2004. All of the foregoing patent applications are hereby incorporated herein by reference in their entireties.

BACKGROUND

This disclosure relates to the field of computer systems. More particularly, a method and apparatus are provided for improving the quality and efficiency of users' browsing experiences and reducing the dangers posed by malware that may be encountered while browsing.

Today's browsers provide users with substandard browsing, primarily because their focus is limited to a single web page at any given time. Specifically, a browser generally displays just a single page, which may include hyperlinks to any number of other pages or sites. The browser does not allow the user to see what is on a linked page until he or she redirects the browser to that page (e.g., by selecting a hyperlink). Only then can the user determine whether that page contains anything of interest to her. If not, she must retrace her action to return to another possible branching point (e.g., by clicking a "back" button).

This pattern—of selecting a link to go to a new page, reviewing its content, and possibly selecting a link on that page—may continue any number of levels deep, all of which must be retraced to return to a starting point. When that starting point is a list of links to web sites or pages (e.g., at a search engine site) or a list of links to goods or services (e.g., at a retail or auction site), a user may have to traverse a number of chains of linked pages, and continually return to the starting point, in the hope of finding content that more closely matches her interest.

In addition, when the user selects a link to navigate to a corresponding page, only then does the browser retrieve the content of that page. Depending on the bandwidth or type of communication link available to the user, and the status of the starting point and target web site (e.g., how congested the web server is), there is often a noticeable time lag before the target page is fully displayed. When the user accesses numerous pages, as is typical during a search session with a search engine or retail/auction site, the combined duration of the time lags can cause a significant amount of wasted time. A user wishing to quickly review several links or pages can become very frustrated with her browser's response time. And, if an error is encountered while trying to load a page, the user may have to try reloading it multiple times before she is successful or before she gives up.

Further, users receive little assistance, if any, while navigating multiple chains of linked pages. For example, when a user browses through multiple chains from a page of search results provided by a search engine, she may come across pages that, while not fully matching her interest, may bear further examination if better pages are not found. Traditionally, she would have to remember how she reached that page (e.g., the sequence of links she selected to get there) or add a bookmark to her browser. Remembering sequences of links becomes more and more difficult as they (and her browsing session) get longer and longer. And, accumulating bookmarks that are of little or no interest makes bookmark management increasingly difficult.

Yet further, in a method of enhanced browsing as described in U.S. patent application Ser. No. 10/985,700, content of linked pages may be retrieved before (e.g., prefetched) or when a link to that content (or an icon associated with the link) is moused-over or clicked on. The retrieved content may be displayed within an enhanced browsing window positioned over the main browsing page. With such enhanced browsing it would be helpful to indicate the status of the content retrieval to reveal, for example, whether retrieval has commenced or completed, whether retrieval is possible, whether a link is non-functioning, etc.

Also, the threat of (e.g., viruses, trojan horses, phishing attacks, worms, spyware, adware) and other electronic security threats continues to grow, but existing browsers do little to identify or prevent such threats from affecting a user's computer. Instead, separate programs (e.g., anti-virus software) are generally used to attempt to detect threatening content. However, these specialized programs typically scan content only after a user navigates to a page containing that content. Thus, the content is already loaded into the user's browser window before it is analyzed to determine if it contains anything that may be harmful or annoying. As a result, before it is scanned the content may already have a chance to generate a pop-up advertisement, replicate a worm, plant a cookie, modify the user's computer configuration, or have other undesirable effect.

SUMMARY

A method and apparatus are provided for security scanning of electronic or digital content. Within a document (e.g., a web page, a word processing document, a list of electronic mail messages), a link to other content or another document is selected by a computing device, before a user clicks on the link to open the content. The content is placed into a safe cache that prevents the content from adversely affecting the user's computing device.

The content is scanned and/or its behavior is analyzed to detect security threats and/or undesirable content (e.g., viruses, worms, scripts, adware, spyware, phishing attacks, buffer overflows, pornography). Results of the analysis may be collected at a central server. The link or an associated indicator may be configured to indicate whether a threat is present; more information may be provided as desired. A user may be provided with various options to ignore a threat, disable the link, etc.

Thus, in an embodiment of the present disclosure, prefetching of links and linked content is combined with security scanning to detect threats or undesired content before the content is loaded into an application and before a user even chooses to open the content. As a result, a security threat within linked content may be dealt with before the content is ever opened or loaded.

Look-ahead security scanning may be combined with a method of enhanced browsing to enable prefetching of linked content before a user requests the content. The content is scanned for threats and an enhanced browsing window may be constructed for the content to allow it to be quickly rendered when the user requests the content.

DETAILED DESCRIPTION

Figure 1:
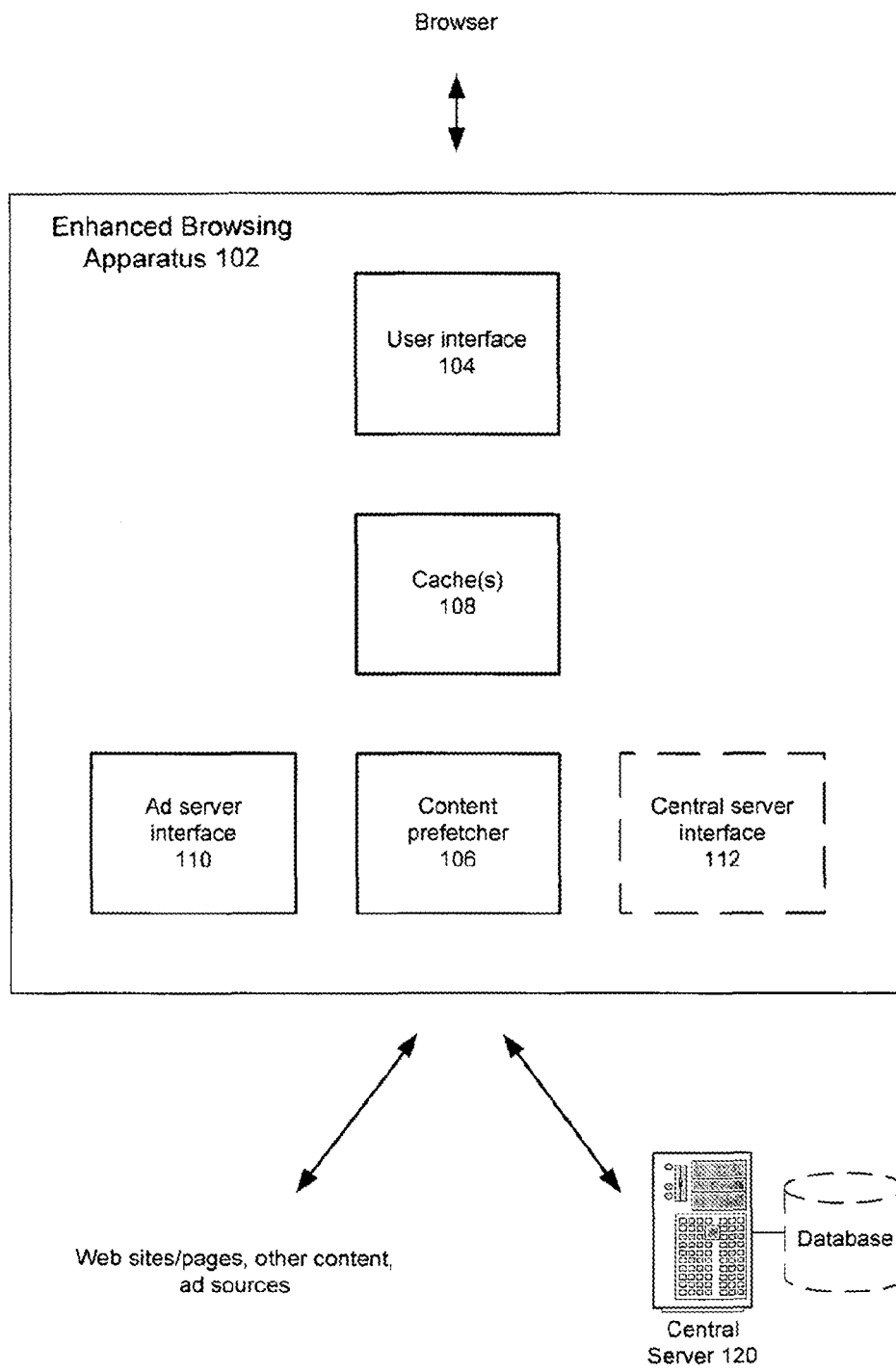
FIG. 1 is a block diagram depicting an enhanced browsing apparatus, in accordance with an embodiment of the present disclosure.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

Introduction

In one embodiment of the present disclosure, a method and apparatus are provided for enhanced browsing of electronic data. A user browses or navigates his browser to a first electronic page (e.g., web page, document, electronic mail message) that contains one or more links or references to other pages or other collections of content. When he selects (e.g., mouses-over or places a cursor over) a link to a second page or an indicator (e.g., an icon) associated with the link, an enhanced browsing window or frame containing content of the second page is displayed on top of or in front of the browser.

In this embodiment, the enhanced browsing window contains actual content from the second page, such as HTML (HyperText Markup Language), not just an image (e.g., a .gif or .jpg image) of the content. The content of the second page may be prefetched before the user chooses to preview it, in which case the enhanced browsing window can be displayed almost immediately when the user selects or hovers a cursor over the link to the second page. The contents of the window may change as the user mouses-over other links, or separate enhanced browsing windows may be generated for each link.

For purposes of describing embodiments of the present disclosure, a "link" that identifies or is associated with data that may be retrieved or prefetched may take any form— graphical, textual or other. A link may therefore include any object (e.g., an icon) or information that embodies or is accompanied by a link (e.g., a hyperlink) or reference to other electronic data or content.

An apparatus for providing enhanced browsing may include various program modules, which may be written in software using any appropriate programming language, or may be coded in firmware. An illustrative apparatus includes a graphical user interface for presenting the enhanced browsing window and controls associated with enhanced browsing, a cache for caching content for display in the window, and a fetcher or prefetcher for fetching the content. The apparatus may also include one or more interfaces to servers storing ads for display in an enhanced browsing window and data describing users' viewing activity. One such interface couples the enhanced browsing apparatus to a central server for facilitating enhanced browsing. The apparatus may be constructed as a plug-in to an existing browser (e.g., Internet Explorer, Firefox), a plug-in to another application (e.g., Microsoft Outlook) or as a complete browser or other application.

The content of the second page displayed in an enhanced browsing window may be augmented with ads, particularly ads relevant to the content. For example, the content may be analyzed to determine a theme or nature of the second page or, if the link to the second page is part of a list of search results, the ads may be selected based on search criteria that yielded the search results. In one implementation of this embodiment the present disclosure, ads retrieved as part of the second page's content may be replaced with different ads. Details of this enhanced browsing embodiment of the present disclosure are provided in a following section. In another embodiment of the present disclosure, content of a page linked to a browsed web page (or other content) is prefetched, possibly for viewing in an enhanced browsing window. Various methods or heuristics may be applied to determine which linked pages or content to fetch or prefetch. Illustratively, when the user's browser displays a page of search results from a search engine (e.g., google.com, yahoo.com), prefetching is done automatically for some or all of the linked pages or content (e.g., web pages or sites that may have information relevant to the user's search criteria). Similarly, when the browser displays a list of links to goods or services offered for sale at a merchant or auction site (e.g., amazon.com, ebay.com), prefetching of content may automatically begin with the linked items. Prefetching may be initiated as soon as the browser receives or displays the main browser page. The prefetching may therefore coincide with the user's review of the page and/or a list of linked pages or links to other content. Thus, before the user even selects a link to content that he would like to see, that content (and/or other content) may be prefetched. Icons or other indicators may be associated with links and configured to indicate the status of the prefetching of content through the links.

In implementations of this embodiment of the present disclosure, a choice of what to prefetch may be heuristically determined based on the font size of a link, the link's location on the browser page, its position within a list of links, etc. Further details of this embodiment of the present disclosure for prefetching are provided in a following section.

In another embodiment of the present disclosure, prefetched content (or content that is to be prefetched) may be scanned for viruses, spyware, adware, trojan horses, pornography and/or other undesired content or code. Illustratively, the content may be placed in a safe cache for purposes of scanning. If a threat or possible threat is detected, a user may be alerted and provided with any number of options regarding how to proceed (e.g., delete the content, ignore the warning, prevent access to the site or page, notify a central authority or other interested party). Details of this embodiment are described in a following section.

In yet another embodiment of the present disclosure, a mechanism is provided for maintaining a user's ability to enjoy an enhanced browsing experience while scrolling through a list of links (e.g., hyperlinks). In one implementation of this embodiment, a graphical stripe or column overlaps or is superimposed on the list. The stripe may be arranged as (or adjacent to) a border or edge of an enhanced browsing window. The list of links may extend multiple pages or screens, and the stripe is configured to extend as the list is scrolled into view. The user may scroll through the list by sliding a user interface cursor along or within the stripe (e.g., up/down or left/right). While navigating within the stripe, content described by the links is previewed or displayed in an enhanced browsing window or a series of windows.

Also while navigating within the stripe, as the cursor nears the boundary of the main browser in a list that is too long to fully display within the browser, the contents of the browser are scrolled. As the cursor crosses over or is aligned with a link, content from that link is displayed in an enhanced browsing window, or a separate window may be opened and closed for each link. Thus, in this embodiment of the present disclosure, the user can very quickly scan the content of some or all links in a list. Further details of this browsing stripe embodiment of the present disclosure are provided in a following section.

In an alternative implementation of this embodiment of the present disclosure, a user operates a mouse wheel or provides other control input (e.g., an arrow key, page up or page down key), while an enhanced browsing window is open with a first page of content, to quickly exchange the current window or contents of the window with content from another link in a series of links. Illustratively, the mouse wheel is operated while a cursor is located proximate to (e.g., on top of, adjacent to) an icon or indicator associated with a link to the first page. When the scroll wheel is rotated, the cursor moves to the icon associated with the next link, and the page containing the links may also scroll.

In another embodiment of the present disclosure, the apparatus displays a graphical depiction of a user's navigation or viewing of content (e.g., web pages, documents, electronic mail messages). The depiction may be rendered as a vertical or horizontal tree, wherein each node corresponds to one item (e.g., web page, image, document) or one set of items.

In one implementation of this embodiment, a tree root is created when the user initiates a new search (e.g., on a search engine site or at a site offering a good or service) and a page of search results is displayed in the user's browser. When the user navigates to a page linked to the current (e.g., search results) page, a new node in the tree is generated and connected to the previous node. As the user navigates deeper by selecting additional links, more and more nodes are added. To quickly move backward in his search, the user may click on a node and be taken back to the corresponding content. From there, he may choose to navigate a different path. Similarly, the user may quickly move to any other content represented in the tree by selecting the appropriate node.

The user may be able to mark a node by altering its appearance (e.g., color, size, pattern); this may facilitate the user's return to a particular page. Further details of this embodiment of the present disclosure are provided in a following section.

Enhanced Browsing

FIG. 1 depicts an apparatus for enhanced browsing of electronic data, according to one embodiment of the present disclosure. In the illustrated implementation, the apparatus is configured as a plug-in or add-on to a web browser such as Internet Explorer by Microsoft Corporation, Firefox by the Mozilla Foundation, Netscape Communicator by Netscape Communications Corporation, etc. In other implementations, the apparatus may be provided as part of a distinct application or browser, or as a plug-in or add-on to a different type of application (e.g., electronic mail, instant messaging, database).

The term "target link" may be used herein to refer to a link whose content is, or may be, selected for retrieval for display in an enhanced browsing window. Similarly, the term "target content" may be used to refer to content that is or should be retrieved for display, with or without prefetching.

Enhanced browsing apparatus 102 operates on virtually any type of computing device (e.g., computer, personal digital assistant, web-enabled telephone) and comprises user interface 104, content prefetcher or fetcher 106, cache(s) 108, ad server interface 110 and optional central server interface 112. The apparatus is coupled to a host browser in a manner similar to other plug-ins.

Enhanced browsing apparatus 102 is coupled to computer systems or networks containing web sites, web pages, documents, electronic mail messages and/or other electronic data or content. The apparatus may be coupled to these entities by any types of communication links, which may be shared (e.g., network) or dedicated, and wired or wireless. In particular, apparatus 102 may be coupled to a central server, which may include or be coupled to a database or other collection of data for facilitating enhanced browsing, as described below. Content accessed through enhanced browsing apparatus 102 may also, or instead, be stored on the same computing device as the apparatus.

User interface 104 is configured to build, display and manipulate an enhanced browsing window. The user interface may also provide any number and type of controls to allow a user to navigate or manipulate content within such a window, such as buttons, icons, a toolbar, etc., and may also accept keyboard input (e.g., key sequences using the CTRL or ALT keys, up and down arrow keys, page up or page down keys).

The various controls may allow a user to initiate or terminate fetching or prefetching of target content, open or close an enhanced browsing window, navigate his or her browser to retrieved content (e.g., by directing the browser to a page displayed in an enhanced browsing window), fetch content linked to content displayed in an enhanced browsing window, replace one enhanced browsing window with another, replace the content displayed in an enhanced browsing window with other content, etc.

In particular, user interface 104 may provide controls, menus or other means that allow the user to customize the enhanced browsing apparatus or change how it operates. User customization options may include: size or position of an enhanced browsing window, number of target links from which to fetch content at a time (e.g., none, all, ten, twenty), how to identify or prioritize target links, default action(s) to take in response to certain user activity (e.g., when the user clicks inside a window or on a link within the displayed target content), how long to delay opening, closing or changing an enhanced browsing window, how or where to display an icon or indicator for opening an enhanced browsing window, etc.

In one embodiment of the present disclosure, user interface 104 builds an enhanced browsing window when target content is retrieved, but keeps the window invisible until and unless the user actually indicates an interest in (e.g., mouses-over) the associated target link or an indicator (e.g., icon) associated with the link. The window is then made visible. Invisible windows may be stored in cache(s) 108.

Content fetcher 106 is responsible for fetching or prefetching content from appropriate sources (e.g., web sites, databases, document repositories, electronic mail gateways) based on default criteria and/or a user's specified criteria. For example, content fetcher 106 may commence prefetching target content immediately after the browser loads or displays a page containing one or more target links, thereby taking advantage of communication bandwidth that is idle while a user examines the page. Any number of links on the browser page may be treated as target links. Content from a specific link may be fetched in response to a predetermined user input (e.g., an ALT-click or ALT-mouse-over of the link or an associated status indicator).

In embodiments of the present disclosure described herein, content fetcher 106 may fetch or prefetch target content when a user expresses an interest in a link by mousing-over or otherwise indicating an interest in a target link or an indicator (e.g., icon) associated with a target link. As described in following sections, an indicator associated with a target link may be configured (e.g., by user interface 104) to indicate a status of the fetching or prefetching (e.g., commenced, in process, completed, aborted, broken link) and/or a status of the content (e.g., previously viewed, contains a virus, contains spyware, contains obscene material).

Content fetcher 106 and/or some other component of enhanced browser apparatus 102 (e.g., a separate target identification module) may be configured to identify target links. As described in the following section, prefetch templates may be employed to identify target links in some web pages or other content. Briefly, a prefetch template is designed for a specific page (or set of pages) and indicates where on the page a target link (or set of target links, such as a list of search results) may be found. Alternatively, any list of links or set of links apparently arranged in a list format may be treated as target links.

However target links are chosen (e.g., by the user, according to a default rule or template), they may be prioritized before the corresponding target content is retrieved. Rules for prioritizing target links are discussed below, and may be based upon the order of the links in a list of search results, their position on the page on which they appear, their font size or some other characteristic.

Depending on any priority assigned to a particular target link, the associated content is retrieved by content fetcher 106. Upon retrieval of the target content, user interface 104 and/or some other component of apparatus 102 constructs an enhanced browsing window for the content. As described in a following section, user interface 104 may be configured to display controls or indicators (e.g., icons) for indicating the status of content fetching or prefetching.

It should be noted that prefetching and prefetch status indication are not required for all embodiments of the present disclosure. Although prefetching content may speed up a user's browsing or previewing of content, other benefits of the present disclosure may be enjoyed without requiring content to be prefetched.

For example, it may be desirable to detect unwanted content (e.g., spyware, viruses, pornography) regardless of whether the content is being prefetched or just fetched. Or, a user may find it helpful to be reminded that he or she has already viewed the content, saved the target link to a favorites list, decided or indicated whether the content is or is not helpful or enjoyable, etc.

Cache(s) 108 include one or more caches for storing target links, target content, prefetch templates, enhanced browsing windows, a user history (e.g., a sequence of sites browsed or previewed) and/or other data. In the embodiment of the present disclosure depicted in FIG. 1, a cache used by enhanced browsing apparatus 102 is separate and distinct from any cache(s) maintained by the browser. Cache(s) 108 need not be included in all embodiments of the present disclosure, or its functions may be performed by some other component of apparatus 102.

In the illustrated embodiment of the present disclosure, when target content is displayed in an enhanced browsing window, it may be accompanied by one or more advertisements. The retrieval of ads is managed by ad server interface 110. The ad server interface interacts with any number of ad sources (e.g., advertisers, media organizations) and/or central server 120. For example, when an advertisement is needed, ad server interface 110 may communicate with central server 120 to determine which ad(s) to retrieve. The ad server interface may then contact the appropriate source to obtain the ad or retrieve it from the central server. The same ads may be displayed in enhanced browsing windows opened for different target links, particularly for all target links appearing on one browser page.

Ads may be content-based, to match or reflect target content within an enhanced browsing window, or may be matched to a main browser page containing the associated target link. For example, if target links on the main browser page comprise a list of search results, the search terms that yielded the search results may be used to select an ad. Thus, ad selection may be made by apparatus 102, central server 120, some other entity (e.g., an ad source), or any combination of these components. Ad server interface 110 may be optional in other embodiments of the present disclosure, or its functions may be performed by another component of apparatus 102.

Central server 120 maintains a database or other collection of prefetch templates, user behavior (e.g., navigation activity or patterns), prefetch or prioritization heuristics, and/or other data. In particular, the central server may collect, from users' enhanced browsing apparatuses, information regarding web pages (or other content) accessed by the users, what links in those pages were selected for browsing or previewing, the order in which they were browsed, etc.

This information may be used to help generate prefetch templates, to prioritize fetching or prefetching, and/or for other purposes. For example, by assembling such information on central server 120 from many users' enhanced browsing apparatuses, the most popular links within content viewed by those users can be determined and/or prioritized for prefetching. Some or all of this data may be replicated on, or shared with, enhanced browsing apparatus 102.

Central server 120 may also be a source of ads and content for display in an enhanced browsing window. The central server may be operated by an organization that provides enhanced browser apparatus 102, or by a different organization.

Optional central server interface 112 communicates with central server 120 to access and share data with the central server, as described above. Thus, the central server interface may forward to the central server information regarding a user's activity (e.g., sites visited, links clicked, search terms employed) and may retrieve information useful in identifying or prioritizing target links (e.g., prefetch templates, analyses of users' preferred links or content).

In other embodiments, an enhanced browsing apparatus may include more or fewer components, or the functionality of the components described above may be distributed in a different fashion. For example, and as described in a following section, an enhanced browsing apparatus may also include a component for scanning target content for viruses, pornography, spyware, adware or other malware or material unsuitable for certain users.

One alternative embodiment of the present disclosure may be implemented without prefetching or using cache 108. In this embodiment, when a user browses a first page and mouses-over or hovers near a link to a second page or a control (e.g., icon) associated with the link, an enhanced browsing window may still be displayed with content from the second page, but the content may not be retrieved until the mouse-over. And, the apparatus may make use of the browser's cache or another cache already available on the user's computing device.

Figure 2:
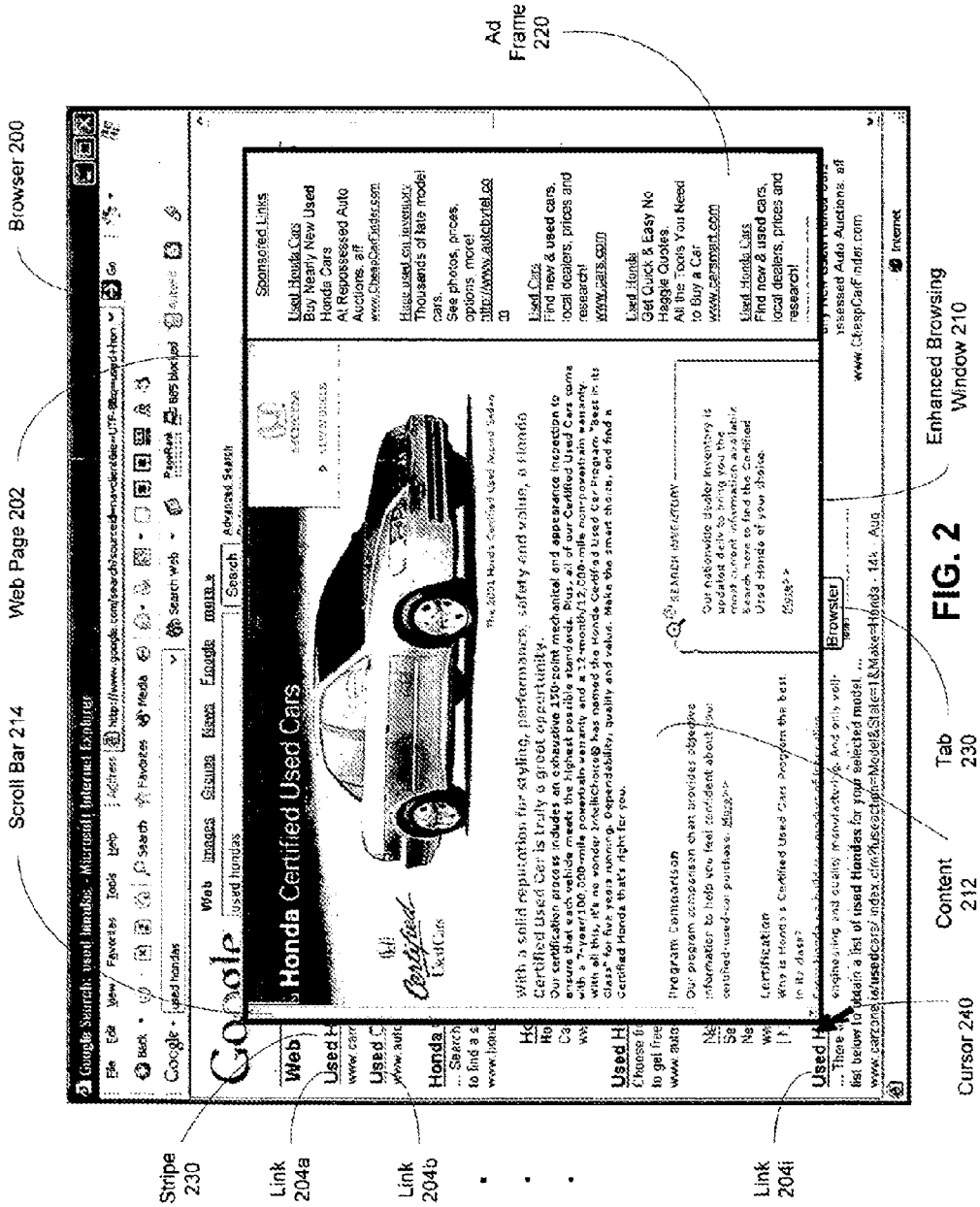
FIG. 2 depicts an enhanced browsing window, in accordance with an embodiment of the present disclosure.

FIG. 2 depicts an enhanced browsing window according to one embodiment of the present disclosure. In FIG. 2, browser 200 (e.g., Microsoft Internet Explorer) is open to a first page 202, which includes a list of links 204 (e.g., 204a-204i). Links 204 are search results in this example, but in other implementations may comprise any types of links, to any type of content. The content identified by or associated with links 204 may or may not be inter-related. For example, if the links comprise results of one search operation, as do links 204 in page 202, their content may be considered inter-related.

Enhanced browsing window 210 is positioned so as to allow a user to see portions of links 204. However, in other implementations, window 210 may cover links 204 to a greater or lesser degree. Alternatively, any or all of window 210 may be made fully or partially transparent, so that some or all of the content of browser page 202 is viewable even when window 210 is displayed. As described above, enhanced browsing window 210 may be constructed and cached prior to being displayed.

In the embodiment of the present disclosure depicted in FIG. 2, when a user mouses-over the link (e.g., link 204i) corresponding to the content 212 of the enhanced browsing window, or a control (e.g., icon, indicator) associated with the link, the window is automatically displayed. The size and/or position of window 210 may be adjustable by a user, but limits may be placed on the user's ability to re-size or re-position the window.

Ad frame 220 is also positioned within enhanced browsing window 210. The ad frame may be arranged in any position or along any edge of the window. Illustratively, ads received along with or as part of content 212 from a location identified by link 204c may be removed or replaced prior to display of the content within window 210.

Content 212 may be reduced in font size to allow it to more fully or easily fit within window 210, and/or scroll bars (e.g., scroll bar 214) may be provided to allow a user to scroll vertically and/or horizontally. If the user clicks (e.g., left-clicks) within window 210, page 202 of browser 200 may be replaced by the page or content displayed in the enhanced browsing window. The user may be able to close window 210 by simply moving the cursor out of the enhanced browsing window (e.g., to somewhere within browser page 202) or taking other action (e.g., right-clicking within the enhanced browsing window).

In one embodiment of the present disclosure, a selectable tab or drop-down menu 230 is positioned adjacent to, or within, enhanced browsing window 210. Clicking on tab 230 opens a menu allowing a user to customize one or more features of the enhanced browsing window or apparatus (e.g., size of window 210, how long the user must pause over a link before the window opens, degree of transparency). Alternatively, menus or controls for customizing a user's enhanced browsing may be located elsewhere within enhanced browsing window 210, or may be summoned with a particular command or user interface input.

In other embodiments of the present disclosure, other user interface controls or options may be provided. For example, a set of controls may be provided to allow a user to specify how the enhanced browsing apparatus should act when the user takes certain action (e.g., clicks on or mouses-over a link within an enhanced browsing window, clicks within an enhanced browsing window but not on a link, mouses-over a second target link while a first link's content is still being previewed).

In one implementation, buttons or controls (e.g., "load," "prefetch content from all links") may be provided with an enhanced browsing window to allow a user to specifically request the target content or target page to be loaded into a browser, to prefetch content or to take some other action. For example, a "hold" button may allow a user to specify that the enhanced browsing window should remain open on its current content regardless of subsequent mouse movements, perhaps until the user selects a "hold off" button or clicks inside or outside the window.

Another button or control may be provided to enable a user to immediately return to the results of the latest search he or she conducted. For example, every time the user initiates a search, a "Back to Search Results" button may be configured with the URL (Uniform Resource Locator) of the search results. Then, until the user initiates a new search, he or she can select the button to return (in his or her browser or an enhanced browsing window) to the latest results.

Figure 7:
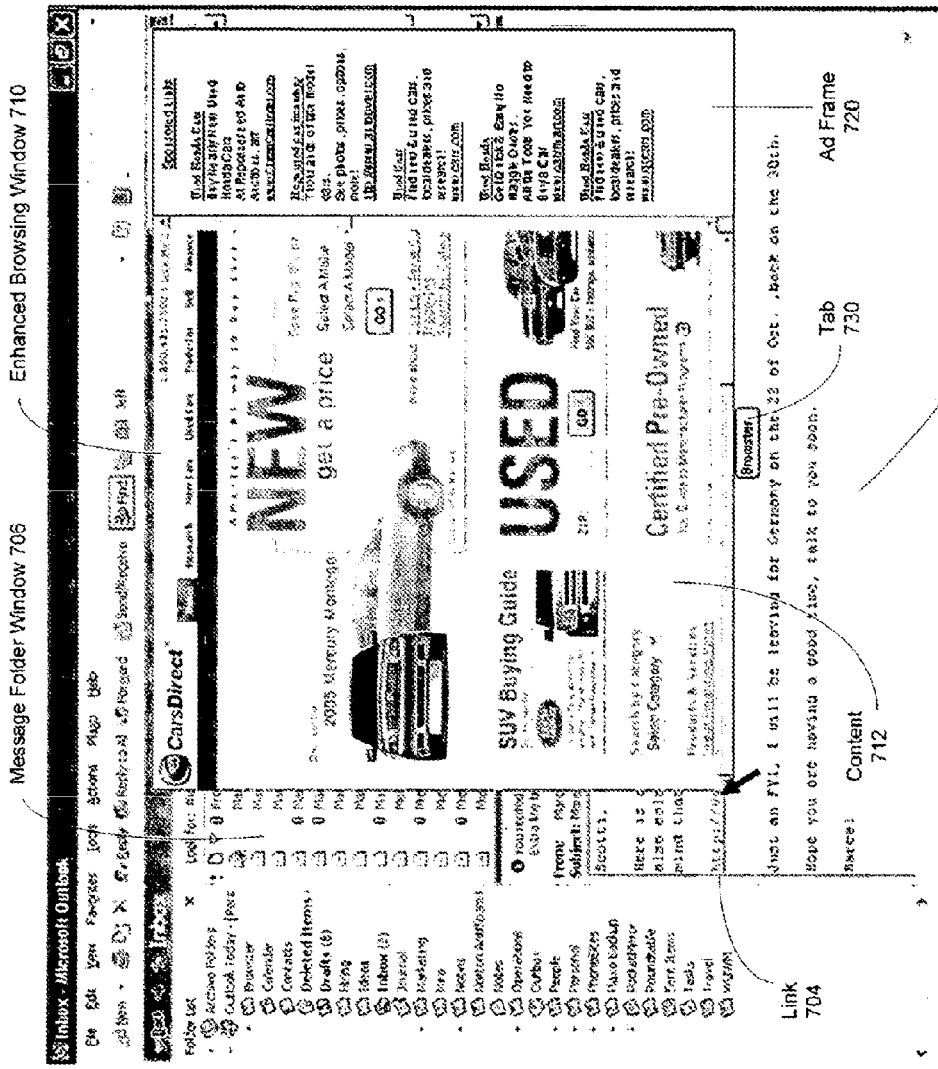
FIG. 7 depicts an enhanced browsing window, in accordance with an alternative embodiment of the present disclosure.

FIG. 7 depicts an enhanced browsing window according to another embodiment of the present disclosure. In FIG. 7, enhanced browser window 710 is employed to preview content within an electronic mail application (e.g., Microsoft Outlook).

In the illustrated implementation, when electronic mail message 702 is displayed, content identified by or associated with a link included in the message (e.g., link 704) may be fetched or prefetched before a user selects the link. Thus, content 712 within enhanced browsing window 710 comprises content retrieved from a location identified by link 704. The enhanced browsing window also includes ad frame 720, which may present ads relevant to content 712 or message 702.

In another implementation, an enhanced browsing window may be employed to preview content of electronic mail messages, such as messages listed or indexed in message folder window 706.

Figure 3:
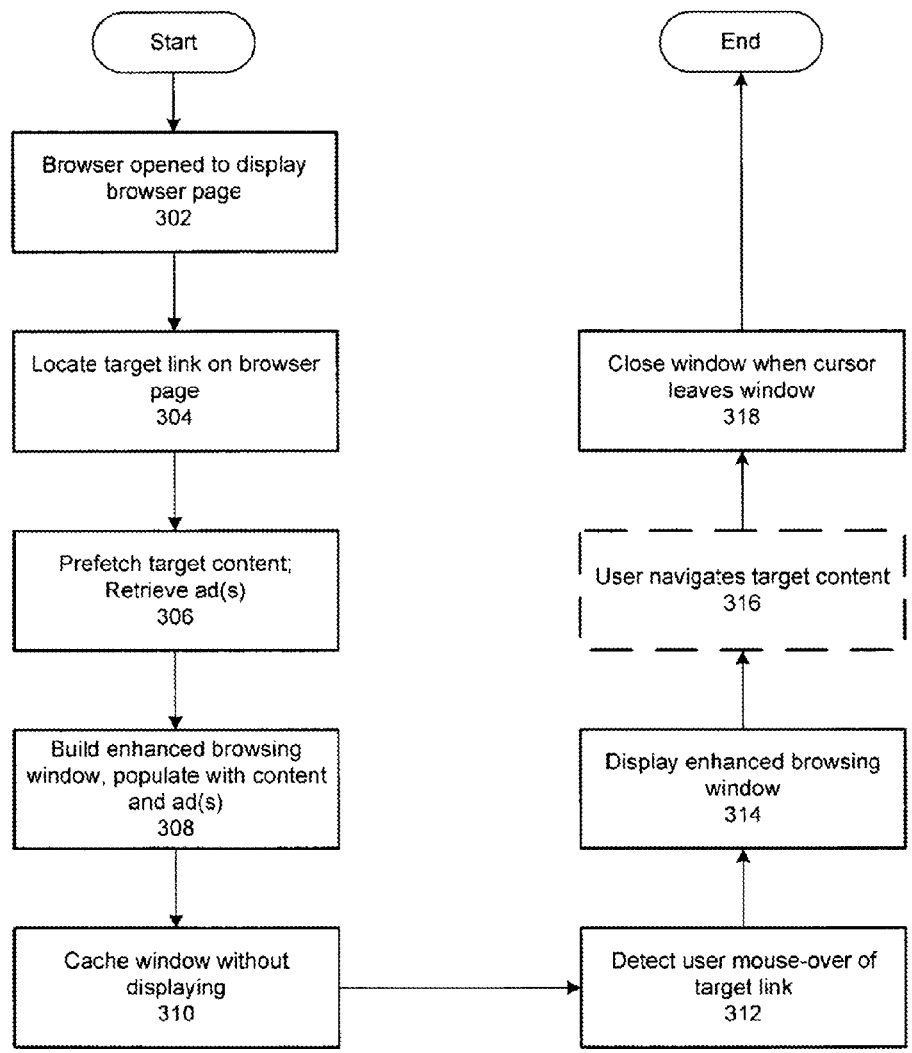
FIG. 3 is a flowchart demonstrating a method of providing enhanced browsing, in accordance with an embodiment of the present disclosure.

FIG. 3 demonstrates a method for enhanced browsing, according to one embodiment of the present disclosure. This method may be employed with apparatus 102 of FIG. 1 and is thus implemented on a user's client computing device, which is equipped with a browser or similar application.

In state 302, the user's browser is opened at a web page or other collection of content, which may be considered the "browser page" herein to differentiate it from another page or other target content displayed in an enhanced browsing window.

In state 304, the enhanced browsing apparatus applies default or custom rules to locate a target link on the browser page. Any number of additional target links may also be identified. For example, the apparatus may automatically locate all links on the browser page and treat them as target links. Or, the apparatus may apply a prefetch template, customized for the browser page, to identify links that are most likely to be of interest to the user.

A prefetch template may be stored (e.g., cached) within the enhanced browsing apparatus, or may be stored on a central server for retrieval by the apparatus before or when the browser page is opened. As yet another alternative, the template or other information for identifying (and/or prioritizing) target links may be retrieved from the same server that served the browser page, or may be received as part of the browser page.

In state 306, content associated with the target link is prefetched. The target content may include all or a portion of the web page, document, image or other data identified by the target link. Thus, the target content may include HTML, XML or other markup language, but in this embodiment of the present disclosure is not just an image of the content. As will be seen below, because the actual content is prefetched, it can be presented in a readable, understandable manner, and can be navigated (e.g., if it contains links). In particular, the prefetched content will not be presented as "thumbnails" or other non-navigable images, which are often illegible.

One or more ads may also be retrieved, to display with the target content. As described above, the ads may be retrieved from any suitable ad source, and may be selected based on the target content, the browser page, search terms entered by the user, the user's browsing history, or other information.

In one embodiment of the present disclosure, a target link or status indicator associated with the target link changes appearance (e.g., design, color, size, underlining, bold) to indicate when the target content has been fetched or prefetched. In one implementation, a target link may first appear (in the browser page) in a first color (e.g., light blue), but then change to a different color (e.g., dark blue) after the target content has been fetched. Multiple color palettes may be employed to allow link colors to be changed easily and rapidly.

In another implementation, described in a following section, a status indicator or icon associated with the target link changes appearance or is altered to indicate the status of the prefetching of content from the target link has changed (e.g., been initiated, completed, failed).

In yet another implementation, after content for a target link is prefetched, if the user navigates the browser to that link (i.e., by clicking on it), the content may be loaded almost immediately from the enhanced browsing apparatus' cache (or wherever else it was stored). Thus, the user's browsing experience is enhanced even without using an enhanced browsing window to preview content.

In state 308, an enhanced browsing window is constructed and populated with the target content and any ads that were retrieved to accompany the content. The content may be resized or may retain its full size, in which case scroll bars may be provided for scrolling vertically and/or horizontally. In different implementations of this embodiment of the present disclosure, ads that were received as part of the target content may be retained, excised or replaced.

In one implementation, when target content from multiple target links is prefetched, enhanced browser windows may be generated (but not displayed) for any number of the links. Thus, if content is prefetched for fifty target links, enhanced browsing windows may initially be generated for any number of the target links, from zero to fifty. Windows may be generated for the remainder later (e.g., after the user starts previewing content).

In state 310, the enhanced browsing window is cached without being displayed. By constructing the window before it needs to be displayed, the enhanced browsing window can be presented almost instantly when the user indicates an interest in the target link. In the method of FIG. 3, a separate enhanced browsing window is constructed and cached for each target link whose content was prefetched. Thus, states 304 through 310 may be repeated for any number of target links.

In state 312, the enhanced browsing apparatus detects a user mouse-over or other selection of the target link. When a user interface cursor (e.g., mouse cursor, a cursor or selector controlled by the TAB key) appears over or adjacent to the target link or a control (e.g., icon, status indicator) associated with the target link, a predetermined period of time (e.g., one second) may be required to pass before the window containing the target content will be switched to visible status. This time period may be adjustable by the user. Illustratively, if the user employs a keyboard for input (e.g., instead of a mouse), selection of the target link may be identified by the user's tabbing to the link and pausing for the necessary time period.

In state 314, when it is determined that the user has moused-over or otherwise selected or expressed an interest in the target link, the enhanced browsing window is made visible. In one implementation, the window is approximately 75% of the size of the user's browser, and may be positioned adjacent to (or overlapping) the target link or a list of links that includes the target link. The screen cursor may be positioned within the enhanced browsing window, near (or over) the target link.

In optional state 316, enhanced browsing may be extended to the target content so that the user can navigate the content or the enhanced browsing window. That is, one or more links within the target content may be treated as target links, in which case their associated content may be prefetched. Then, if the user mouses-over a target link in the target content, or a control (e.g., status indicator) associated with that link, another enhanced browsing window may be created to display the new target content. Or, the target content of the enhanced browsing window may be replaced with the new target content.

Illustratively, if the user clicks on the target link associated with the target content, or left-clicks (i.e., clicks the primary mouse button) within the target content (but not on a link), the browser page may be replaced by the target content or the page containing the target content. The same action may be taken if the user leaves the cursor motionless within the enhanced browsing window for a predetermined period of time (e.g., 5 seconds). If the user clicks on a link within the target content, the linked content may replace the target content within the enhanced browsing window or the user's browser may be directed to that content or page.

In state 318, if the user moves the cursor out of the enhanced browsing window, it may close because it may be assumed that the user is no longer interested in viewing the target content. Or, right-clicking (clicking a mouse button other than the primary button) or executing some other command within the window (e.g., but not on a link) may cause it to close.

If the user moves the cursor from the window to a second target link, the window may disappear and be replaced with the enhanced browsing window constructed for the second target content (or the target content may be replaced by the second target content). In one embodiment of the present disclosure, if the user rotates a scroll wheel or generates other predetermined input (e.g., up arrow or down arrow), the cursor may be automatically moved to the next (or previous) link and the corresponding target content will be displayed in an enhanced browsing window.

In one embodiment, the state of an enhanced browsing window may be retained for some period of time after it is closed. Then, if a link to the same content is moused-over or otherwise selected for enhanced browsing, the window may open with the same state (e.g., centered or scrolled to a portion of the content previously displayed in the window).

As one skilled in the art will recognize, the enhanced browsing experience described herein differs significantly from a traditional "pop-up" within a web page. Traditional pop-ups, when selected, merely display information that was received with or as part of the web page. In contrast, an enhanced browsing window displays content from a different page or source, and that content may be navigable. In one implementation, the enhanced browsing apparatus may be configured to suppress traditional pop-ups.

The illustrated method ends after state 318.

In one implementation of this embodiment of the present disclosure, as a user mouses-over different target links and new enhanced browsing windows are opened, the same or similar ads may accompany each set of target content. The ads may change, however, if the user directs her browser to a different page, initiates a new search (with new search terms) in the browser page, or doesn't click on any of the ads. In the latter case, if a set of ads is presented a number of times and the user expresses no interest in them, another examination may be performed of the user's latest search criteria and/or the content of pages she has chosen to view, and a new set of ads may be selected for placement in an enhanced browsing window.

In another implementation of this embodiment of the present disclosure, a user's enhanced browsing apparatus or window may be branded or customized by an organization that provides the enhanced browsing apparatus (e.g., a favored web site) or by some other organization. In this case, an enhanced browsing window may be constructed with the provider's logo, with a link to the provider, with ads sponsored by the provider, etc.

In yet another implementation, the enhanced browsing apparatus is installed and operated at a central server. In this implementation a user navigates to the server to engage and employ the apparatus. This implementation may be well suited for thin clients.

Prefetching Target Content

In one embodiment of the present disclosure, methods are provided for identifying and/or prioritizing target links for retrieval of associated target content. The links may be identified within a web page or other browsable object (e.g., document, image, electronic mail message). Content from any number of links on the page (i.e., zero or more) may be retrieved.

As described in the preceding section, prefetching of content may be done in a default manner, or may be based on user-specified criteria and/or criteria customized for a particular web page or site. Thus, content from links that are more popular or more likely to be selected by a user may be prefetched before (or instead of) content from links less likely to be selected by the user.

In one implementation of this embodiment of the present disclosure, a prefetch template may be used to identify a set of links on a page. A prefetch template may be designed for a specific web page or site, to identify target links (or recommended target links) by their location or position on the page. For example, lists of search results (e.g., from a search engine or merchant web site) may be located in various locations on different pages (e.g., in a single column on the left or right hand side of a page, in a two-column table), and prefetch templates for those pages would be designed accordingly.

Content described by links other than those identified by a prefetch template may also be prefetched, but the target links identified by the prefetch template may be awarded higher priority. Illustratively, the default order of prefetching target content may match the order in which their links are posted on the page (or in a list of search results), or content for some or all target links may be prefetched simultaneously (e.g., in parallel).

Enhanced browsing apparatuses may maintain (or even generate) prefetch templates, or may retrieve them from a central server or other source. Thus, when a particular page is loaded into a browser, an enhanced browsing apparatus operating with the browser may quickly retrieve a prefetch template from the central server.

In another implementation, a prefetch template for a web page (or other content) may comprise a list of target links on that page. The list may be prioritized, and may be derived by observing any number of users' selection of links while browsing or viewing the page. Thus, a central server may collect data regarding multiple users' browsing activity (e.g., pages visited, links selected), and distill the data to identify and/or prioritize links on web pages those users' visited.

In other implementations of this embodiment of the present disclosure, all links on a page may be treated as target links by default, or all links within a list of search results. Content from any number of target links may be prefetched in any order and/or in parallel with other links' content. Yet further, a link retrieved as part of the content associated with a target link may also be treated as a target link, in which case content that is multiple pages or multiple links removed from the current page (the current page to which a browser is open) may be prefetched without leaving the current page.

In yet other implementations, heuristics may be used to help identify and/or prioritize target links, in addition to or instead of using a prefetch template (e.g., for a page for which no prefetch template is available). For example, a set of heuristics may specify that links having certain characteristics or meeting certain criteria should be target links, or that target links should be prioritized based on those characteristics or criteria. Illustrative characteristics include: the region of a page in which a link is located (e.g., center, top, left side), font size, link color, the number of links to the same content (e.g., the more links there are to a particular page of content, the higher priority it should receive), a link's proximity to an image or other notable content, etc.

In another implementation of this embodiment a user may be able to select or de-select target links for prefetching. For example, the user may be able to enter one particular key sequence (e.g., ALT-B) or select one particular control or button within a user interface to instruct a content prefetcher to target one certain link, or all links, on a page, or some other key sequence (e.g., ALT-N) or control to prevent the apparatus from targeting a certain link or any links.

A user may be able to train an enhanced browsing apparatus to identify target links. For example, the user may be able to select desired target links on a page (e.g., by drawing a box around them, by mousing-over or clicking on them), after which the apparatus memorizes the links for automatic identification the next time the user visits the page. Illustratively, to train the apparatus the user may first initiate a training mode (e.g., by activating a particular user interface control), then select the target links and disengage the training mode.

In one implementation, a user may be able to construct or customize a prefetch template, which may be useful if the user often visits a page for which the enhanced browsing apparatus does not have a template. A user interface for the apparatus may provide controls allowing the user to construct the template by identifying locations of target links in the page, by specifying that all links are target links, by selecting individual links as target links, by specifying that certain links are not target links, by choosing characteristics for selecting target links, etc.

As described above, an enhanced browsing apparatus may collect a user's browsing or previewing (i.e., enhanced browsing) activity to help identify target links. Thus, if the user frequently selects or navigates to links arrayed along the right side of pages at a particular site, upon a subsequent visit to that site the user's enhanced browsing apparatus may automatically treat such links as target links and prefetch their associated content. Similarly, if the user selects links in a set of links in a particular order (e.g., top to bottom, bottom to top, left to right), the enhanced browsing apparatus may prioritize prefetching of the links' content accordingly.

Data accumulated by the apparatus may be shared with a central server in order to accumulate and analyze data for multiple users, which may then be distributed to their (and/or other users') enhanced browsing apparatuses to help identify or prioritize target links. For example, based on activity data collected from users who visited a particular web site, the central server may identify certain links (or links in a certain location of a page at that site) as being most popular. That information may be shared with users' apparatuses to make those links target links. In one implementation, however, users may be provided with an option to not share information regarding their browsing activity.

Thus, a centralized database for identifying and/or prioritizing target links may be maintained. Individual enhanced browsing apparatuses may receive data from the database on periodic intervals, when a browser is opened (or opened to a particular page), or on some other schedule. For example, when a browser is directed to a particular page, the database may be accessed to retrieve pertinent data.

In addition to, or instead of, collecting at a central database data regarding users' activity (e.g., what sites they visited, what links they clicked on), similar data may be retrieved from web sites. This information may indicate which pages/links were most often selected by the web sites' visitors, the most popular order in which they were selected, etc. This information may be retrieved by a central server or by a user's enhanced browsing apparatus.

In one method of prefetching, links may be chosen as target links, or target links may be prioritized for prefetching, based on a point system. For example, from information accumulated by the enhanced browsing apparatus or a central server, links on a web page may be assigned points based on their popularity (e.g., how often they were selected), the relevance of the associated content, or some other characteristic(s). For example, points may be awarded based on heuristics (e.g., font size, location of a link within a page). The more points awarded to a link, the more likely it is treated as a target link and/or the higher priority it may receive for prefetching.

Prefetching is not limited to links present or visible in a single page. For example, a page displayed in a browser may be too long to view at once, and so some links on that page may be off-screen. Further, and as can be seen with search result listings, a list of links may span multiple pages, with each page linked to the next (e.g., using "previous" and "next" buttons). Therefore, in one method of prefetching content for enhanced browsing, links may be target links even if they are off-screen or on a page linked to the current page. In general, any number of pages that continue or are forward-linked to a current page (e.g., by "next" buttons) may be prefetched, and/or links appearing on those pages.

In addition, when a web page or other content that contains links is prefetched or displayed in an enhanced browsing window, those links may be treated as target links. Thus, a user may use the enhanced browsing window to quickly navigate several levels or links away from the page to which his or her browser is currently opened.

In one method of prefetching, when target content cannot be retrieved, the target link's appearance may be altered. For example, the link may be changed to a different color (e.g., gray, yellow) to alert a user that the link is not functional. Prefetching may fail because a target link is broken or a "page not found" error is received, a necessary certificate or other security token is not available, or for various other reasons.

Alternatively, and as described in a following section, status indicators may be displayed in association with target links, to indicate the status of content fetching or prefetching, and/or the status of the content itself.

In one implementation of an embodiment of the present disclosure described in another following section, prefetched content, or content to be prefetched, is scanned for viruses, obscene or pornographic material, other malware (e.g., spyware, adware), etc.

Figure 4:
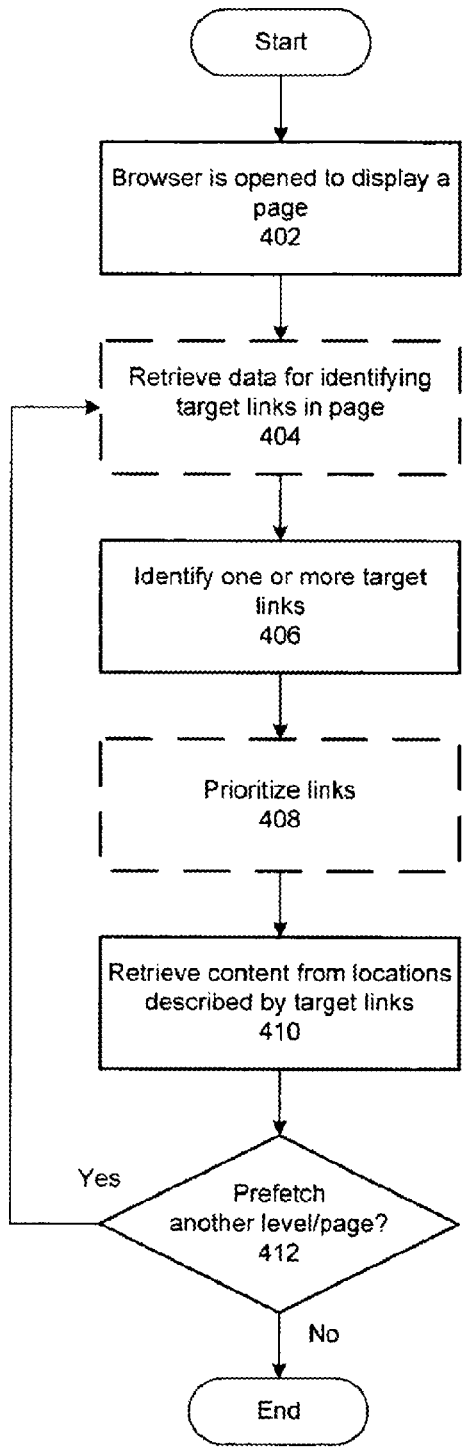
FIG. 4 is a flowchart demonstrating a method of prefetching target content, in accordance with an embodiment of the present disclosure.

FIG. 4 demonstrates a method of prefetching electronic data or content, according to one embodiment of the present disclosure. As described above, prefetching may be performed in many different ways in other embodiments.

In state 402, a user's browser is open to a web page or other electronic content (e.g., document, image, electronic mail message), which may be considered the "browser page" herein to differentiate it from a page or other target content displayed in an enhanced browsing window.

In state 404, a set of data for identifying target links in the browser page may be retrieved from local or remote storage (e.g., from a central server). The data may include a prefetch template, a list of specific links, heuristics, etc.

In state 406, one or more target links are selected in a default manner (e.g., all links on the page) and/or using data retrieved in state 404. For example, if the page contains a relatively small number of links (e.g., five, ten), they may all be considered target links (and prefetching may begin immediately) without waiting for data designed to facilitate the identification of target links. Some or all of the links are to pages or sites different from the browser page, and therefore will require prefetching of content from different locations than the browser page was received from.

In state 408, the target links may be prioritized. For example, data for prioritizing target links may be retrieved separately or in conjunction with data for identifying target links. Data for prioritizing target links may include information regarding the relative popularities of links on the page (e.g., from a central server, from the web site that provided the browser page), a recommended order of priority, heuristics, etc.

In state 410, the target content is prefetched. If the target links were prioritized, their content may be prefetched in priority order. Additionally, content from multiple target links may be retrieved in parallel. The number of prefetch operations performed in parallel may depend upon the available communication bandwidth. For example, if the user has a broadband connection, more prefetches may be done in parallel than if the user has a dial-up connection.

In this embodiment of the present disclosure, the target content is retrieved as is. In other words, the content is retrieved in its true form (e.g., HTML, XML), and is not simply converted into an image (e.g., a snapshot, a thumbnail) of the content.

Illustratively, the prefetched content may include the full content described by a target link or located at the specified location (e.g., URL or Uniform Resource Locator). Or, some of the content located at or retrieved from that location (e.g., an ad, an image) may be discarded.

In state 412, it is determined whether prefetching should proceed to the next level (i.e., to links within prefetched content) or another page. If so, another page is selected, such as a page retrieved as target content in state 410, and the method returns to state 404. Otherwise, the method ends.

State 412 may be applied sometime after target content is retrieved. For example, after content is retrieved in state 410, it may be cached until a user chooses to preview it in an enhanced browsing window. When this occurs, the method of FIG. 4 may be applied to the page or content being previewed.

In another method of prefetching, identification of target links and/or prioritization of target links for prefetching may be dynamic, and depend upon a user's enhanced browsing activity. For example, if a user selects for previewing a first link in a particular position on a web page, it may be assumed that he or she will also want to preview content from links close to the first link. Thus, some prediction may be made to what content a viewer may wish to preview.

In yet another implementation of this embodiment of the present disclosure, content may be prefetched from a pay-per-click or pay-for-performance ad (e.g., a textual ad, a banner, an image) without the prefetching counting as a "click." In particular, an advertisement or other type of content may register each user "click through" (or selection) of the ad, with each click through generating revenue to an entity that presented the ad.

In this implementation, content from the ad is prefetched like other content, but no "click through" is registered until the user actually selects the ad for browsing (or, in one alternative implementation, until he mouses-over the ad). Illustratively, when the ad content is prefetched, the URL or XML code used for the prefetching may include a tag, keyword or other indicator that the ad content is not being retrieved as part of a click through. When the user selects the link (i.e., generates a click through), then a normal "click through" of the ad may be initiated. This helps ensure that the ad revenue is correctly apportioned. However, the content may be served from the prefetched version rather than awaiting the newly requested copy.

In another method of prefetching target content, content is fetched when a user mouses-over an icon or other graphical object associated with a link to the content. Thus, if the content is not prefetched before the user expresses an interest in the link, it is fetched in reaction to the mouse-over.

Look-Ahead Security Scanning

In one embodiment of the present disclosure, a method and apparatus are provided for performing look-ahead security scanning or analysis of electronic content a user may access. Performing look-ahead security may involve scanning the content for various types or forms of security threats.

The term "security threat" as used to describe implementations of this embodiment of the present disclosure, encompasses any content that may compromise or adversely affect a computing device or its use, but may also include content that a user of the device does not want to receive. Security threats therefore include viruses, worms, trojan horses, spyware, adware, cookies, scripts, phishing attacks, buffer overflows, etc., as well as undesirable content such as pornography or advertisements.

As described below, a look-ahead security module may search for specific threats (e.g., known viruses or cross-site scripts), or may search generally for malicious code, malware or undesirable content. Any type of data or information may be analyzed or examined for security threats, including text, executable or interpretable code, graphics, and so on.

An embodiment of the present disclosure described in this section may be implemented with an embodiment of the present disclosure described in another section. For example, content that is scanned may comprise target content being fetched or prefetched for display in an enhanced browsing window.

Figure 9:
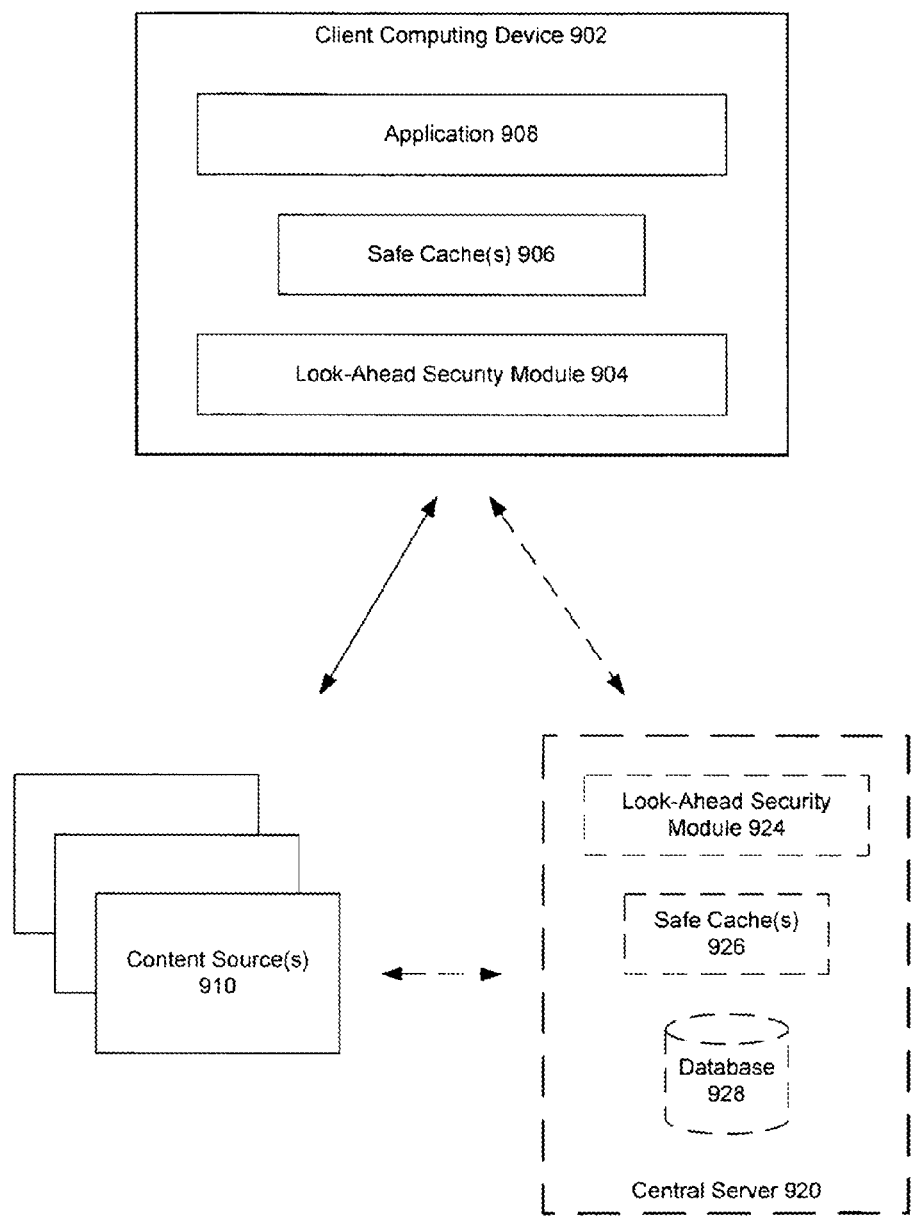
FIG. 9 depicts a computing environment in which look-ahead security scanning may be performed in accordance with an embodiment of the present disclosure.

FIG. 9 illustrates a computing environment in which an implementation of this embodiment of the present disclosure may be operated. In this environment, a user operates client computing device 902, which may be a mobile, desktop or workstation computer, a personal digital assistant or other device capable of providing the user access to electronic content. Content accessed on client device 902 may be retrieved from various sources 910, and may include web pages, documents, graphics, scripts, applets, etc.

Client device 902 includes look-ahead security module 904, one or more safe caches 906 and one or more applications 908 allowing a user to access content from sources 910. Illustrative applications include a browser, a word processing program, a spreadsheet program, a database management system, an electronic mail program, an instant messaging program, a graphics program, and so on.

In one implementation, while application 908 executes, look-ahead security module 904 detects a link displayed by the application to content offered by a content source 910. Before a user clicks on or selects the link to access the content (in the same or a different application), security module 904 retrieves the content, places it in safe cache 906 and analyzes it to determine if it contains a security threat.

Safe cache 906 comprises data storage (e.g., memory, disk storage) that can be used to isolate the proactively retrieved content while it is scanned or analyzed by look-ahead security module 904. In one implementation, an executable or interpretable portion of the content (e.g., an applet, a script) may be executed or interpreted while the content is stored in the safe cache, and before an application 908 can open or access the content. This may be done to observe its behavior and help determine whether the content comprises a security threat.

More particularly, in one implementation a safe cache is designed to prevent the content from altering or possibly even accessing memory or storage locations outside the safe cache, on client device 902 or elsewhere. For example, a virtual operating system, virtual computer or other construct may be implemented using safe cache 906 to emulate an environment in which the content would normally be opened. Security module 904 can thus determine what type of input, output or other operation(s) the content is designed to perform. Its operation can be compared to known viruses, worms, trojan horses or other malicious code to determine if the content poses a threat.

A script, URL (Uniform Resource Locator), data pattern or other code may alternatively be analyzed without executing or interpreting it within a safe cache. For example, a data, string or code pattern may be analyzed to determine if it may be intended to facilitate a buffer overflow. A script or URL may be parsed to determine if it is part of a cross-site script or phishing attack.

Although the security module may primarily analyze content retrieved from sources external to the client computing device, in other implementations look-ahead security module 904 may scan content retrieved from within client computing device 902.

Security scanning or analysis may be performed by look-ahead security module 904 for content corresponding to any number of links within a document or other set of data opened by application 908. Security threats within such content can therefore be detected and dealt with before the same (or a different) application opens or presents the content to the user.

Unlike some traditional threat-detection software, look-ahead security module 904 can prevent the content from ever being able to infect or otherwise affect the client computing device. And, the look-ahead nature of the security module allows the user to be warned of possible security threats (e.g., content that appears to be malicious or undesirable but does not precisely match a known threat) even before he or she attempts to open or access the content.

In one implementation, a link to content analyzed by security module 904 may be altered to indicate the status of the content. For example, one color or attribute (e.g., font, font size) may be used for the link before the content is analyzed. A different color or attribute may be applied after analysis, to indicate that the content contains a security threat, does not contain a security threat or may contain a threat (e.g., the analysis was inconclusive).

In another implementation, an icon or indicator associated with the link may be altered, or different icons/indicators may be used, to indicate whether a security threat was detected. This implementation may be applied with an embodiment of the present disclosure that provides the user with enhanced browsing, wherein the icon or indicator may be used to open fetched or prefetched content.

In yet another implementation, when a user expresses an interest in the content, by clicking (or mousing over) the link or an associated icon or indicator, a warning message or alert may be displayed to alert the user to the presence of a security threat within the content. The lack of such an alert may indicate that the content is safe. A warning message may identify a specific security threat (e.g., by providing the name of a detected virus) and/or may report the type of threat (e.g., virus, spyware, pornography).

A user may be presented with various options or actions to be taken after content is scanned. For example, a link to content containing a definite threat may be deleted or disabled to prevent it from being activated. Or, a threat may be ignored (thereby allowing the content to be opened), the document may be closed, the threat may be disabled or excised from the content, etc.

In the embodiment of the present disclosure depicted in FIG. 9, central server 920 may be employed to perform look-ahead security scanning and/or collect results of security scanning performed by client computing devices. Central server 920 may perform look-ahead security scanning or analysis in addition to, or in place of, client device 902.

Any number of client computing devices may be coupled to central server 920, with some or all of them relying upon the central server to perform security scanning. Look-ahead security module 924 may operate similarly to security module 904 of client device 902, to proactively retrieve content for security scanning within a safe cache 926.

In one implementation, central server 920 may perform look-ahead security scanning for thin clients or other devices that have low communication bandwidth connections, limited processing capability or other limitations.

In another implementation, look-ahead security module 924 of central server 920 may crawl or "spider" the Internet or another collection of content sources (e.g., an intranet, a local or wide area network) to retrieve content for security scanning. Thus, security module 924 may comprise a search engine designed to search for virtually any type of security threat and/or undesirable content, without waiting for a user or user application to access or attempt to access the content.

Database 928 may be used to assemble various results, statistics or other metadata regarding security scanning performed by a client computing device and/or central server 920. Thus, when a client device or the central server scans some content, the results of that scan may be transmitted to database 928. Such results may identify the content in any suitable manner (e.g., by filename, Uniform Resource Identifier or URI), and indicate what security threats were found, if any.

Database 928 may therefore be consulted when a look-ahead security module operating on client computing device 902 or central server 920 identifies a link to content that should be scanned. If an identity of the content matches a result stored in the database, the stored results may be adopted instead of re-scanning the content. Any suitable means may be employed to match the identities of a current piece of content and content that was previously scanned or analyzed (e.g., name, URI, CRC, checksum, size).

Central server 920 may be operated by an organization that provides look-ahead security module 904, by a content source, or some other entity.

In the environment depicted in FIG. 9, look-ahead security scanning of any type of linked content may be performed on either or both a client computing device and a central server. Advantageously, the scanning is performed before the content is opened by an application designed to provide a user access to the content (e.g., for viewing, for editing), and/or before the user even selects or expresses an interest in the link or the content.

A look-ahead security module may apply look-ahead security to any or all content linked to a document opened by an application. Links and associated content may be prioritized for scanning based on location or order within the page, a location of linked content, type of content, etc.

Figure 10:
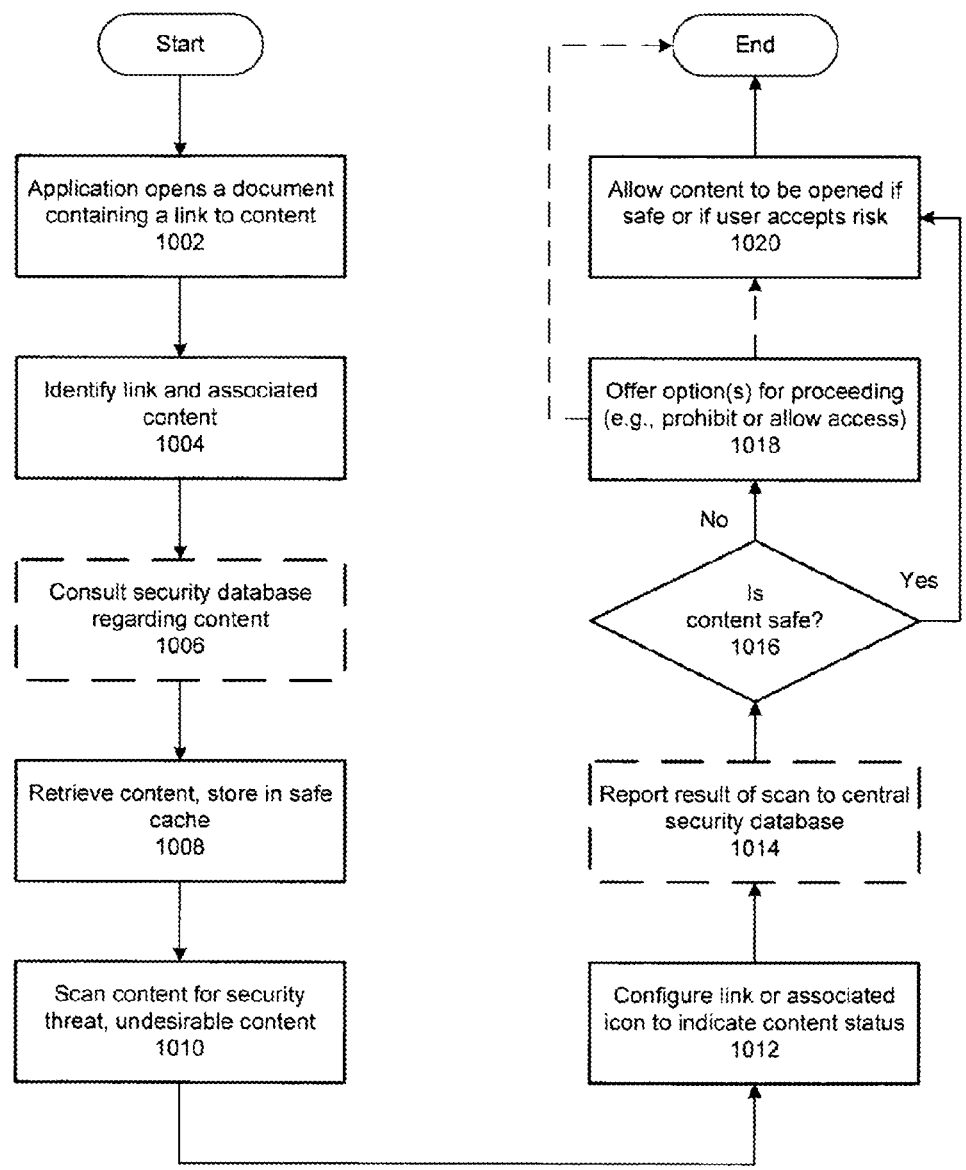
FIG. 10 is a flowchart demonstrating a method of performing look-ahead security, in accordance with an embodiment of the present disclosure.

FIG. 10 is a flowchart demonstrating a method of performing look-ahead security, according to one embodiment of the present disclosure. In this embodiment, security scanning or analysis may be performed locally at a client device and/or at a central server. For example, the client device may scan a first content object (e.g., a script, a web page) linked to a document opened in an application executing on the client, while the central server scans content linked to the first content object.

In operation 1002 of this method, an application executing on a user's client computing device (e.g., a word processor, an electronic mail client, an instant messenger client, a web browser, a spreadsheet program) opens a document (e.g., a word processing document, a list of electronic mail messages, a chat window, a web page, a spreadsheet) containing any number of links to electronic data or content.

The link may be a traditional HTML (HyperText Markup Language) hyperlink, or may comprise virtually any other type of link (e.g., script-based, flash-based, XML or Extensible Markup Language). The linked content may comprise another document or some other type of content that can be accessed with a computing device, and may include static or dynamic text or graphics, executable or interpretable code, etc.

In operation 1004, a link and its associated content are identified (e.g., by a look-ahead security module operating on the client device). The link may be identified before a user clicks on the link or takes other action to open the associated content.

The content may be identified by filename, URI, path, location, the link or other means, and may be located within or external to the client device. As exemplified by a typical web page, the content may be offered by a source other than the source of the document containing the link to the content.

A security threat may be more likely to be found within content not controlled by the provider of the document. Therefore, links to content offered by the document provider may not be subjected to look-ahead security, or may receive lower priority than links to content from other sources.

Thus, links may be prioritized based on some estimate of risk or danger. In particular, links to content from unknown providers (or providers known to have previously offered content containing a security threat) may be followed and checked before other links.

In optional operation 1006, when the linked content is identified, a database maintained on a central server (or elsewhere) may be consulted to determine if a security threat was previously identified within the content. The database may be maintained by a provider of the look-ahead security module or a third party (e.g., a content provider, a provider of other security related software).

In operation 1008, the linked content is retrieved and stored in a safe cache or proxy cache. As described above, a safe cache may be configured to allow the content to exhibit its normal behavior (e.g., within a virtual operating system or on a virtual desktop), but may prevent the content from actually altering memory, storage or other components of the computing device containing the safe cache.

The safe cache may be located on the user's client computing device, or may be located on a central server. Yet further, content from multiple links in the document may be analyzed for security threats, and some analysis may be performed on the client device, while other analysis is done on the central server.

In one implementation featuring a central server having a safe cache, the central server may proactively spider or crawl any number of content sources to retrieve and analyze content. In this implementation, any or all of operations 1002-1006 may be omitted.

In the illustrated embodiment of the present disclosure, the safe cache is separate from any cache employed by the application that opened the document. This helps ensure that malicious content never has an opportunity to infect the client device.

Yet further, when the content is opened for the user, it may be opened from the safe cache (e.g., rather than an application's cache), especially if the user chooses to ignore any warnings or alerts posted by the look-ahead security module. This may be done to prevent the content from loading or running any malicious code.

In operation 1010, the content is scanned or analyzed within the safe cache. The analysis may search the content for any type or types of security threats or undesirable components, and may therefore catch content that would otherwise damage or alter the user's client device, or that would be objectionable to the user if opened on the device.

To assist in the security scanning, multiple programs or modules may be invoked separately or in an integrated manner. For example, if the content is sequestered in a safe cache on the client computing device, scanning software included with a look-ahead security module may be invoked, but other security software on the client may also be invoked (e.g., an anti-virus program, a program for eradicating adware) or software may be imported from a central server to assist in the scanning. Similarly, if the safe cache is located on the central server, any security software available on the central server may be employed.

In addition, however, a third party tool or program may also be employed. For example, an anti-virus software provider's server may be contacted to learn of the latest viruses, worms or other threats. Or, a data pattern or code pattern indicative of a security threat may be retrieved from a third party and compared to content within a safe cache on the client computing device or the central server. Thus, tools, utilities and other software for detecting security threats and undesirable content from virtually any provider may be applied to content that has been isolated within a safe cache.

In operation 1012, the link to the content, or an associated icon/indicator, may be configured or modified to reflect a result of the scanning. Illustratively, if a threat is detected, some attribute of the link or an indicator placed near the link may be altered (e.g., color, size). Or, the link may be disabled (permanently or temporarily).

In one implementation, after the content is scanned, if the user highlights, clicks on, mouses-over or otherwise expresses an interest in the content, link or associated indicator, more details of the scan may be provided. For example, a window or dialog box may be opened to report the scan results, and may identify any specific threats that were identified (e.g., by name). The results may indicate that a security threat (or undesirable content) was or was not found, or that the scan was inconclusive. Illustratively, a textual or graphical measure of risk may be provided.

Information regarding a detected threat may be retrieved from a central server or a third party and reported to the user. Such information may include a level of risk, the threat's impact on the client device, etc.

In optional operation 1014, results of the scan may be reported to a central security database. Scan results may be collected to allow preemptory disabling of links to content previously determined to contain a threat, to track the activity of hackers, spammers and/or other threat sources, etc.

In operation 1016, if the content is deemed safe (e.g., no threats detected, no serious threats detected), the method advances to operation 1020. If a security threat was detected or the scan was inconclusive, the method continues with operation 1018.

In operation 1018, the user may be offered any number of options for proceeding. Illustrative options include ignoring the danger (and allowing the content to be opened), quarantining the content, disabling the link, closing the document, opening the content in a safe mode (e.g., in a virtual desktop) that prevents the content from adversely altering the client computing device, excising the threat from the content and allowing the remainder to be opened, etc.

Depending on the user's choice, the method may end (e.g., if the user chooses to disable the link or close the document), may proceed to operation 1020, may return to operation 1002 to open another document, may return to operation 1004 to select another link, etc.

In operation 1020, the content is to be accessed. The content may be free of security threats or the user may have chosen to ignore any threats. The content may be opened in the same application that opened the original document, or in a different application. The content may be copied from the safe cache into a cache or other memory controlled by the application that opens the content, or may be opened within the safe cache.

After operation 1020, the method may end or may return to operation 1004 to select a link within the content or another link within the original document.

The method described above in conjunction with FIG. 10 is just one method of performing look-ahead security. Other methods may be derived from the preceding description, the figures and other sections of this document without exceeding the scope of the present disclosure.

Indicating Fetching and/or Content Status

In one embodiment of the present disclosure for providing enhanced browsing, icons, buttons or other indicators are displayed within a page of electronic data to indicate the status of content fetching or prefetching from target links within that page, and/or the status of the target content. The indicators, which may be considered "status indicators," may comprise any type of object (e.g., an animated or static icon) that can embedded within electronic content and provide a visual and/or audio status indication.

When configured to indicate content status, a status indicator may reveal whether a security threat was detected within the target content. As described in a preceding section, security threats may include viruses, spyware, adware, other malware, pornography, other types of obscene or inappropriate content, etc.

A status indicator may also, or instead, indicate the status of a target link or an electronic connection to a content location identified by the link. For example, a status indicator may reveal that a link is broken, that an electronic connection to the linked site or page has low bandwidth or is noisy, that a connection is fast or slow, or may provide some other information regarding the quality or status of the link or communication connection. Status indicators may be received as part of the web page or other content in which they are displayed. Alternatively, the indicators may be dynamically inserted by some script or code included in the web page, by a user interface configured to facilitate enhanced browsing (e.g., user interface 104 of FIG. 1), another component of an enhanced browsing apparatus, or by some other client application or browser plug-in.

Individual status indicators may be associated with each target link (or one indicator may be associated with multiple target links), and may comprise controls for taking some action relating to enhanced browsing. For example, left-clicking or mousing-over an indicator associated with a target link (with or without some other key input, such as an ALT key) may serve as a trigger for fetching, re-fetching or prefetching the corresponding target content and/or displaying an enhanced browsing window containing the content.

Some other action (e.g., right-clicking on an indicator, ALT-clicking) may open a menu or set of options for configuring an enhanced browsing experience (e.g., to turn prefetching on or off, adjust the timing with which an enhanced browsing window is opened or closed, choose the type of information to indicate with an indicator, configure user interface controls).

In one embodiment of the present disclosure, indicators are inserted when target links are identified, and may change appearance to indicate that prefetching of target content is initiated, completed, delayed, impossible, etc. An indication that prefetching is complete may mean that the target content has been prefetched and is ready for display in an enhanced browsing window. An indication of successful prefetching may inherently indicate that the content has been cached, or such status may be separately indicated.

Indications of prefetching failure may differ for different reasons for the failure (e.g., connection timed out, target content unavailable, broken link) or may be uniform and simply reveal that prefetching could not be completed. A status indicator may indicate that prefetching is partially complete, and may even indicate how complete (e.g., by fraction or percentage).

Embodiments of the present disclosure may be implemented within a search result listing, a shopping site, electronic mail (web or client-based), online classified ads, job boards, blogs, news story listing, and virtually any other type of application or utility that involves collections of links. These implementations may therefore be configured for operation with browsers, electronic mail programs, news readers, search clients, word processing applications, spreadsheet programs, databases, etc. A status indicator may be placed beside, above, below or in some other location that may readily indicate an association between the indicator and the associated link. Placement of status indicators may be configurable by users.

Indicators may be embedded into a web page via DHTML (Dynamic HyperText Markup Language), javaScript or some other programming or scripting language. The indicators may become part of the layout of the page in which they appear, or may float over the browsing window and therefore not be part of the page.

Indicators need not always be visible. Whether a particular indicator is displayed may depend on the number of target links on a page, the type of information represented by the indicator, how the page is laid out, etc. For example, if a page comprises multiple frames with many links, indicators associated with some links may not appear until a cursor is moved into a particular frame. In one embodiment, a status indicator may not be displayed for a link if content cannot be prefetched from that link.

As prefetching of target content proceeds, a status indicator associated with the corresponding target link may change appearance. For example, a status indicator may flash, blink, change color or intensity, change sound, changed design, exhibit motion, etc. Or, an indicator indicating a first status of the prefetching may be replaced by another indicator indicating a different status. The status indicator associated with target content currently displayed in an enhanced. browsing window may be highlighted or otherwise marked to show that it is the current status indicator.

Figure 8:
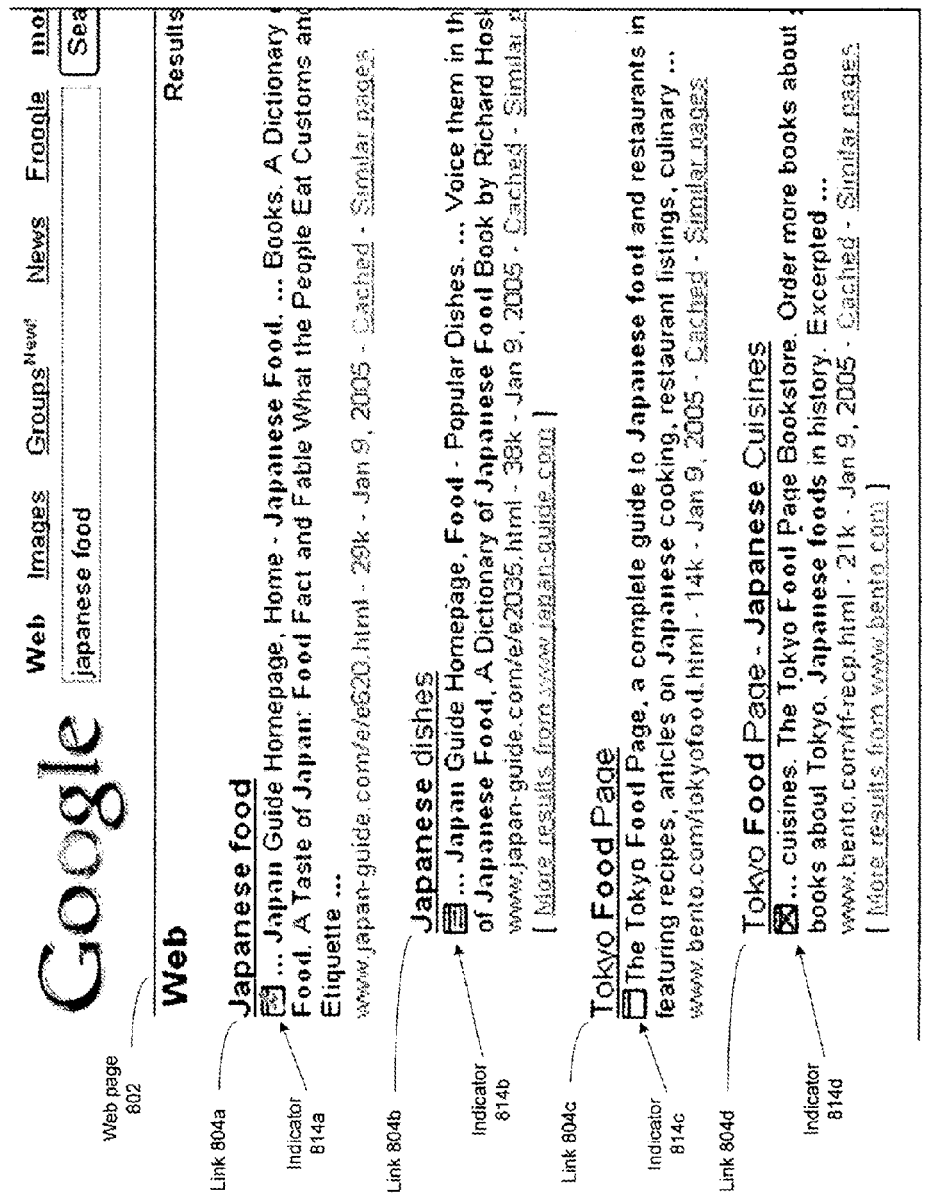
FIG. 8 depicts illustrative icons for indicating the status of target content or target content retrieval, in accordance with an embodiment of the present disclosure.

FIG. 8 demonstrates how status indicators for indicating prefetching and/or content status may appear in one embodiment of the present disclosure. In FIG. 8, web page 802 is displayed by browser 800, and includes target links 804a-804d. Individual indicators 814a-814d are associated with the target links.

In this embodiment of the present disclosure, a status indicator comprises a rectangular icon, possibly reminiscent of a miniature web page. Before prefetching of content for an associated target link commences, an icon may be plain, dim or opaque, as shown by indicator 814c. When prefetching successfully completes, as shown by indicator 814a, a lightning bolt, check mark or other affirmative symbol is added to the icon.

For a target link whose content is currently being prefetched, a status indicator (e.g., indicator 814b) may include an arrow or other symbol of activity. If a particular target link's content cannot be fetched (e.g., or prefetching times out), the associated status indicator may be marked with an "X", a slash or other negative symbol, as illustrated by indicator 814d.

In an alternative embodiment of the present disclosure, a status indicator such as indicator 814c may first appear when a target link is identified. The indicator may retain the same appearance until prefetching succeeds (e.g., indicator 814a) or fails (e.g., indicator 814d). In this alternative embodiment, therefore, indicator 814b may not be employed, especially if a high-speed data connection is available, which would allow prefetching to be completed quickly.

In one embodiment of the present disclosure, content from a first target link is displayed when a user mouses-over or selects in some other manner an indicator associated with the first target link. The user may then rotate a mouse scroll wheel or provide other input (e.g., press an arrow key) to display content fetched or prefetched from a next target link or previous target link, depending on the direction of rotation. Thus, in this embodiment of the present disclosure, content from multiple target links may be viewed quickly, without requiring fine cursor movement.

When a scroll wheel (or equivalent input) is used to move from one status indicator to another, the main browser page may be scrolled by the distance between the two status indicators, unless the page can no longer be scrolled in the corresponding direction. Regardless of whether the main browser page can be scrolled the same distance, the cursor used to mouse-over the status indicator may be repositioned to the next status indicator. A time delay may be imposed when a user scrolls from one status indicator to another, to help prevent from scrolling too far or to the wrong status indicator.

In one implementation of this embodiment, the cursor is automatically moved to the next, or previous, status indicator. And, the web page in which the target links are displayed may also scroll (e.g., to keep the cursor in relatively the same location of the display screen). The target links and associated status indicators need not be aligned linearly. If not linear in alignment, as the web page scrolls in one direction the cursor may be offset to place it over the next indicator.

If an enhanced browsing window in which target content is displayed normally closes after some period of time when the user's cursor is outside the enhanced browsing window (e.g., when it is hovering over the associated status indicator), in this embodiment of the present disclosure, that behavior may be modified so that the window does not close while the cursor remains on (or near) an indicator. For example, until the cursor is no longer positioned above a status indicator, or some other action is taken, scrolling the mouse wheel may continue to cause content from different target links to be displayed (in the same or different enhanced browsing windows).

Other user input may affect the user's enhanced browsing experience in similar or different ways. For example, pressing up and down arrow keys (or left and right arrow keys) while a mouse cursor is positioned within the enhanced browsing window may cause the displayed target content to scroll. Pressing those keys while the cursor is in the main browser page, however, may cause the cursor to move to the previous or next status indicator (and change the target content displayed in an enhanced browsing window).

Similarly, pressing page-up and page-down keys or clicking appropriate controls (e.g., "previous" and "next," "forward" and "backward") while a mouse cursor is positioned within the enhanced browsing window may cause the displayed target content to be replaced by the content associated with the previous or next status indicator. Providing the same input while the cursor is positioned in the main browser page, however, may cause the content of that page to scroll.

Enhanced Browsing Stripe

In one embodiment of the present disclosure, an enhanced browsing stripe or column is provided for facilitating enhanced browsing of target content identified by multiple links in a page. For example, when a list of search result links (e.g., from a search engine, from a merchant or auction site) is displayed in a browser, the enhanced browsing stripe may be overlaid or superimposed on the list.

A user interface cursor may then be moved within the stripe and, as the cursor passes over or adjacent to a link, an enhanced browsing window may be opened to display the target content. Or, if an enhanced browsing window is already open, the displayed target content may change as the cursor reaches different links.

In different implementations, an enhanced browsing stripe or column may be horizontal, vertical, diagonal or even non-linear, so as to overlay or remain close to links in a browser page. A stripe may be of any thickness (e.g., one-quarter inch, one centimeter), and may be transparent or semi-transparent (e.g., light gray) so as to allow a user to read or identify a link underneath the stripe.

When a list of links is I-irk presented (e.g., in a browser page), the stripe may or may not be automatically applied. If not, when a user mouses-over or selects a first target link in a list and an enhanced browsing window is displayed with the corresponding target content, the stripe may be presented at that time. The stripe may therefore appear adjacent to an enhanced browsing window or as one edge or border of the window.

In FIG. 2, stripe 230 is placed adjacent to the left edge of enhanced browsing window 210, but only extends over the list of links 204, not the full length of the window. The stripe may extend the full length of the window in other implementations. As can be seen in FIG. 2, stripe 230 extends below the bottom edge of window 210, so that it appears over all links 204.

In one implementation, when an enhanced browsing window is opened and an enhanced browsing stripe displayed, a user interface cursor (e.g., mouse cursor 240 in FIG. 2) may be moved to a position within the stripe and on top of or near the target link whose content is displayed within the window. This may make it easier for a user to quickly preview content from other links, by moving the cursor within the stripe to those links. The stripe may be closed or removed if the cursor is moved (or clicked) outside of the stripe and an open enhanced browsing window. Alternatively, the cursor may be initially placed within the enhanced browsing window.

If the cursor is moved within the stripe to one end of the stripe, and the list of links associated with the stripe extends past that end, off the display device (e.g., to another page or screen), the web page or other content containing the list of links may be automatically scrolled to reveal additional links. The stripe will automatically extend as the content is scrolled, for as long as additional links appear. Alternatively, a stripe may extend even beyond the list of links, to allow a user to continue scrolling the web page (e.g., to the end of the page). If an enhanced browsing window is open when the web page is scrolled, the window may remain in the same location of the display device as scrolling continues.

An enhanced browsing stripe may be generated and maintained by a user interface or other component of an enhanced browsing apparatus.

Figure 5:
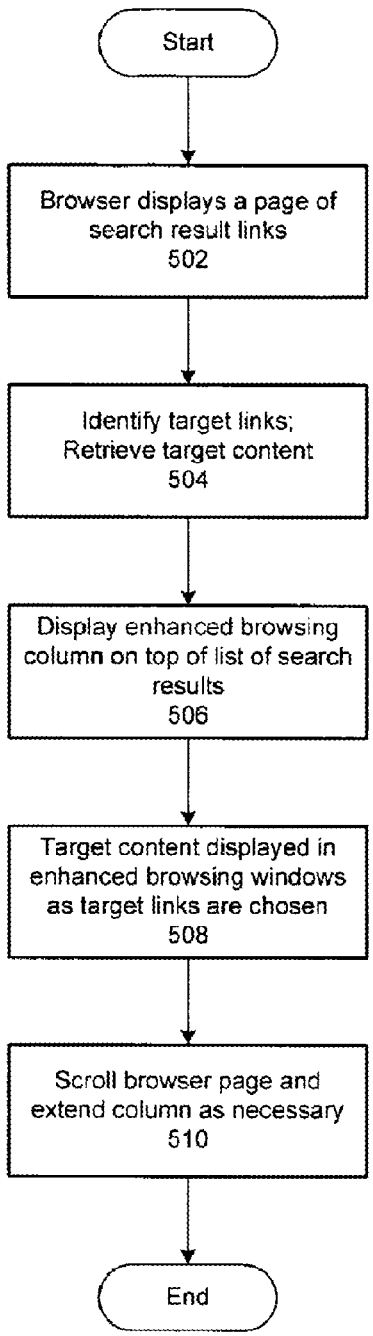
FIG. 5 depicts a method of using an enhanced browsing column or stripe, in accordance with an embodiment of the present disclosure.

FIG. 5 demonstrates a method of using an enhanced browsing stripe or column to facilitate enhanced browsing, according to one embodiment of the present disclosure.

In state 502, a user's browser is opened at a web page or other electronic content (e.g., document, image, electronic mail message) that contains a list of search result links. The web page may be considered the "browser page" herein to differentiate it from a page or other target content displayed in an enhanced browsing window.

In state 504, target links are identified, including some or all of the search result links. Any or all links may be identified by default, a prefetch template may be applied, a list of most popular links may be used, etc. The links may be prioritized, and content identified by some or all target links is retrieved.

Enhanced browsing windows may be constructed (but not yet displayed) for target content for some or all of the target links. Illustratively, all target content is retrieved, but not necessarily all at the same time (i.e., in parallel).

In state 506, an enhanced browsing stripe is displayed on top of the list of search results. The stripe may be displayed as soon as one or more target links' content is retrieved, may be displayed when a first enhanced browsing window is displayed, or may be displayed as soon as the target links are identified.

In state 508, as the user moves a user interface cursor over target links, but within the enhanced browsing stripe, target content for the links is displayed in one or more enhanced browsing windows. For example, a first window may be opened when the user mouses-over a first target link. That window may remain open while the user moves the cursor, and other links' content may replace the first link's content in the window. Alternatively, an enhanced browsing window may open when the user mouses-over a target link, and then close when the cursor leaves the link.

In state 510, if the cursor is moved to the edge of the browser window and the list of search results extends to another page or screen, the browser page will be scrolled as needed (e.g., upward, to the lefty to bring other links onscreen. The enhanced browsing stripe will extend or elongate as the page scrolls. After state 510, the method ends.

Graphical History Navigation Tree for Searching/Browsing

In one embodiment of the present disclosure, a method and apparatus are provided for facilitating a user's navigation or browsing of search results or some other collection of interrelated links to electronic data. In one implementation of this embodiment, a graphical history navigation tree is rendered, wherein each node corresponds to a different web page or other set of data (e.g., documents, images, electronic mail messages).

The tree may be displayed anywhere within the user's display screen, such as within a window placed immediately below an enhanced browsing window (or immediately below a location at which an enhanced browsing window may be opened), along the left or right side of the display screen, etc. Within its window, a history navigation tree may start with a root representing a new set of search results or a new browsing session, and thereafter grow in any direction (e.g., from left to right, from top to bottom). A new tree root may be placed when a new search is initiated, when a new browser window is opened, or anytime a user requests a new tree be started.

Execution of a new search may be detected by monitoring the web site or page a user is browsing. Initiation of a new browsing session may be assumed when a browser is opened. If the site the user is browsing employs a search engine and the user engages the engine, a root of a new history navigation tree may be placed at that time. Any previous history navigation trees may still appear in the same window, but may be scrolled off-screen as the current tree grows.

In one embodiment, each time the user navigates (e.g., in the browser) to or previews (e.g., in an enhanced browsing window) one of the search result listings (or some other top-level link within the page being browsed), a new child node is added to the current tree and connected to the root. As the user continues to navigate or preview linked content, yet more nodes are added and linked to the history navigation tree. Thus, for each page, site or other collection of content the user accesses, another node is added to the tree.

Thereafter, the user can quickly navigate to or preview content previously visited by selecting the appropriate node. Illustratively, if the user clicks (e.g., left-clicks) on a node, the user's browser is opened to the corresponding content. If the user mouses-over a node (e.g., for a predetermined period of time) or right-clicks on the node, the corresponding content may be opened for previewing in an enhanced browsing window.

Thus, an enhanced browsing apparatus's cache may store content corresponding to any number of nodes in the current history navigation tree, and/or previous trees. Alternatively, the content may be retrieved from the target page or site at the time the user clicks on or mouses-over a node.

When the user clicks on or mouses-over a node corresponding to a particular web domain or site, a list of links visited at that domain may be displayed. Thus, a node may represent a collection of web pages or content, not just a single document.

A user may be permitted to alter the appearance of a node. For example, if the user decides that a particular page warrants a closer examination if nothing more interesting or helpful is found, he may choose to change the node's color, size or other characteristic (e.g., make it blink, animate it) to mark it. One particular marking may be applied to identify the node corresponding to content the user is currently browsing or previewing.

Similarly, the user may be able to notate a node and/or search (e.g., to name the search) by selecting it (e.g., right-clicking) and entering his notes into a file that will be saved with the tree.

The appearance of a node or a link between nodes may be configured to reflect a security status of associated content. For example, a node corresponding to content that has been determined to contain a security threat may have a different color, shape size or other attribute than nodes associated with safe content.

As described above, a new search/browsing history navigation tree may be started for each new search. However, when a user merely modifies the search terms of a current (or previous) search, this may simply result in a new branch being added to the current (or previous) tree.

A search/browsing history navigation tree may be generated and maintained by a user interface or other component of an enhanced browsing apparatus.

Figure 6:
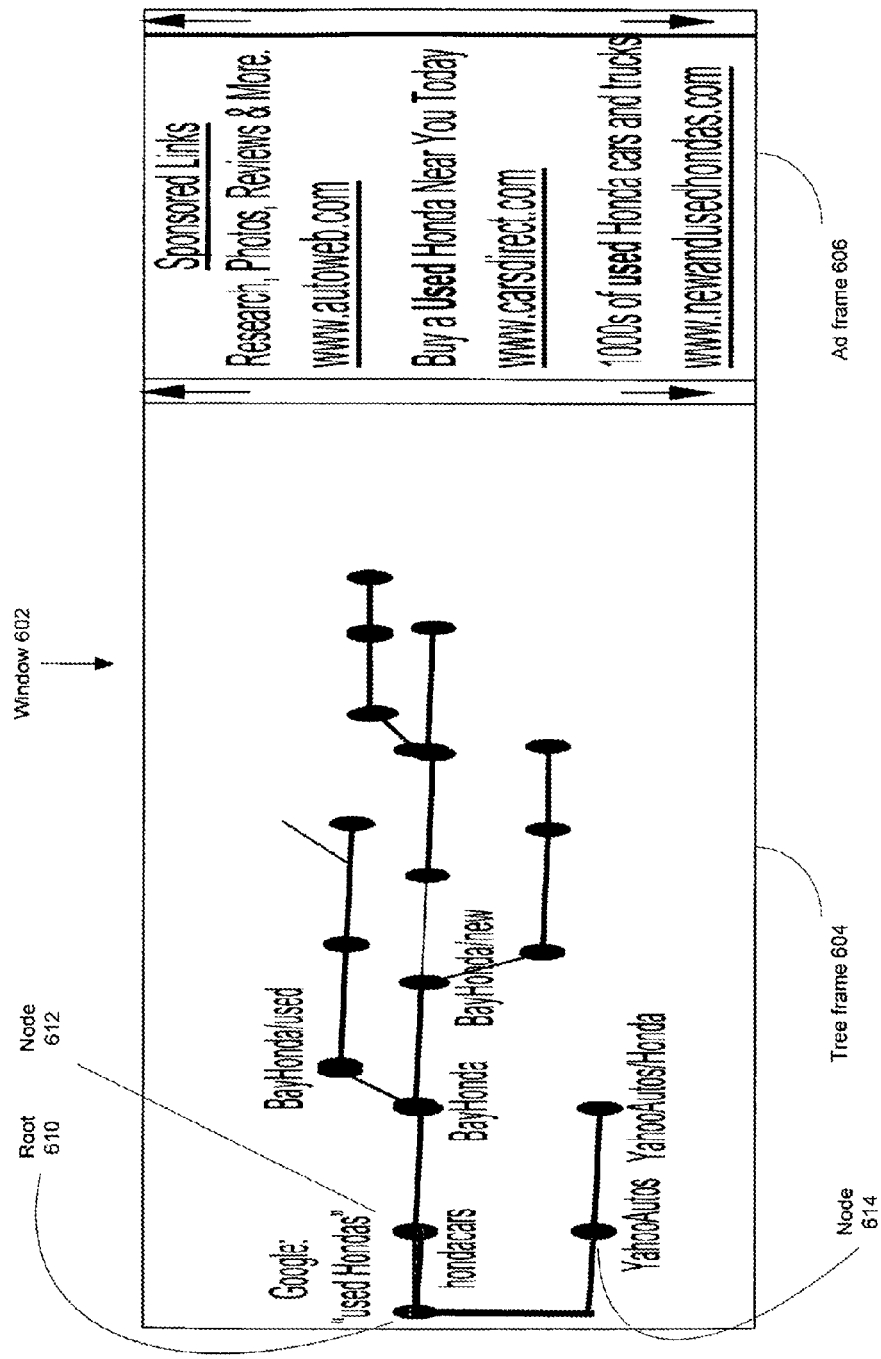
FIG. 6 illustrates a navigation tree for facilitating a user's navigation of content that was browsed or searched, in accordance with an embodiment of the present disclosure.

FIG. 6 depicts a search/browsing history navigation tree, according to one embodiment of the present disclosure. Program code for generating such a tree may be implemented as a plug-in to an existing browser.

In FIG. 6, window 602 tree frame 604 and ad frame 606. The horizontal nature of window 602 makes the window suited for placement above or below an enhanced browsing window. In other embodiments, window 602 may be oriented vertically.

The history navigation tree displayed in tree frame 604 begins with root 610, which, in this example, corresponds to a search for a used Honda automobile. This search may have returned any number of links to relevant content. Among those links, the user has so far browsed or previewed web pages or sites identified by two top-level links, corresponding to nodes 612, 614.

As the user visited or previewed content linked to those pages, additional nodes were added to represent that content. As shown in FIG. 6, any number of nodes may be notated. Such notations may be automatically extracted from HTML of the corresponding content, or may be specified by the user. Logos of organizations associated with a node's content may be displayed in addition to (or instead of) descriptive text.

Window 602 is expanded in FIG. 6 to allow for closer inspection. In different implementations of this embodiment of the present disclosure, the window may be relatively narrow in height (when aligned horizontally) or width (when aligned vertically), on the order of 0.5 inches to 1.5 inches.

The visual history navigation tree allows a user to easily track his navigation and quickly jump from one node's content to another's. Because window 602 may remain open even after the user navigates away from the search results, he can quickly and easily return. Window 602 may include standard controls (e.g., buttons) to close, expand, minimize or otherwise manipulate the window.

Because a history navigation tree may be saved (e.g., to disk), the user may open a history navigation tree window (e.g., using the normal browser drop-down menus), which may be automatically populated with the most recent tree.

Ads displayed in ad frame 606 may include ads relevant to the search associated with the tree in tree frame 604, ads relevant to the specific node the user is at, pay-per-click sponsored ads, etc. Either or both of tree frame 604 and ad frame 606 may include scroll bars (horizontal and/or vertical).

The program environment in which a present embodiment of the present disclosure is executed illustratively incorporates a general-purpose computer or a special purpose device such as a hand-held computer. Details of such devices (e.g., processor, memory, data storage, display) may be omitted for the sake of clarity.

It should also be understood that the techniques of the present disclosure may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

The foregoing embodiments of the present disclosure have been presented for purposes of illustration and description only. They are not intended to be exhaustive or to limit the invention to the forms disclosed. Accordingly, the scope of the invention is defined by the appended claims, not the preceding disclosure.

The invention claimed is:

1. A method of secure scanning of a second web page linked to a first web page being displayed by a browser in a browser window, the method comprising:
   identifying, in the first web page, a target link to the second web page, wherein the target link is identified from one or more links that are contained within the first web page, wherein the one or more links are prioritized by a client computing device based on a location of the one or more links in the first web page to determine a prefetching order, and wherein the target link is identified and prioritized before a request for content of the second web page is sent from the client computing device to a computing device that stores the content of the second web page;
   prior to receiving a user selection of the target link or of an indicator associated with the target link, prefetching content from the second web page, the content including web page data, applets, or scripts;
   loading the prefetched content from the second web page into a safe cache on the client computing device according to the prefetching order before receiving the user selection of the target link or of the indicator associated with the target link and before the content of the second web page is opened by an application configured to provide access to the content of the second web page on the client computing device; and
   scanning the prefetched content from the second web page for a security threat, within the safe cache, wherein the safe cache is configured to prevent the prefetched content from altering a memory location or storage location external to the safe cache.

2. The method of claim 1, further comprising:
   detecting placement of a cursor proximate to the target link or the indicator associated with the target link; and
   in response to the detecting:
   in response to identifying a security threat with the prefetched content, presenting a warning along with one or more selectable options, including an option to ignore the warning; and
   in response to identifying no security threat with the prefetched content or receiving from the user a selectable option to ignore the warning, causing display of a second window comprising the prefetched content.

3. The method of claim 2, further comprising prior to said causing display of a second window:
   generating but not displaying the second window;
   populating the second window with the prefetched content; and
   caching the second window.

4. The method of claim 2, wherein the second window is an enhanced browsing window lacking one or more functions provided by the browser window.

5. The method of claim 2, wherein the second window is configured to close in response to movement of the cursor out of the second window.

6. The method of claim 1, wherein:
   the indicator is configured with a first appearance if no security threat is identified in the prefetched content; and
   the indicator is configured with a different appearance if a security threat is identified in the prefetched content.

7. The method of claim 1, wherein the prefetched content contains executable code and said scanning comprises executing the code within the safe cache to determine a behavior of the executable code.

8. The method of claim 1, further comprising:
   notifying a central server of a result of the scanning the prefetched content for a security threat.

9. The method of claim 8, further comprising:
   prior to said scanning, querying the central server for a result of a previous scanning of the prefetched content.

10. The method of claim 1, wherein the security threat comprises one or more of a virus, a worm, or a trojan horse.

11. The method of claim 1, wherein the security threat comprises one or more of spyware or adware.

12. The method of claim 1, wherein the security threat comprises one or more of a phishing attack, a cookie, or a script.

13. A non-transitory computer-readable storage medium storing instructions thereon that, if executed by a computing device, cause the computing device to perform operations of enhanced browsing with security scanning, the instructions comprising:

instructions to identify, in a first web page, a target link to a second web page, wherein the target link is identified from one or more links that are displayed within the first web page, wherein the one or more links are prioritized by a client computing device to determine a prefetching order based on an appearance of the one or more links within the first web page, and wherein the target link is identified and prioritized before a request for content of the second web page is sent from the client computing device to a computing device that stores the content of the second web page;

instructions to, prior to receiving a user selection of the target link or of an indicator associated with the target link, prefetch content from the second web page, the content including web page data, applets, or scripts;

instructions to load the prefetched content into a safe cache on the client computing device according to the prefetching order before receiving the user selection of the target link or of the associated indicator and before the content of the second web page is opened by an application configured to provide access to the content of the second web page on the client computing device; and instructions to scan the prefetched content for a security threat, within the safe cache, wherein the safe cache is configured to prevent the prefetched content from altering a memory location or storage location external to the safe cache.

14. The computer-readable storage medium of claim 13, wherein the instructions further comprise:
  instructions to detect placement of a cursor proximate to the target link or the associated indicator; and
  instructions to, in response to said detecting:
    in response to identifying a security threat with the prefetched content, present a warning along with one or more selectable options, including an option to ignore the warning; and
    in response to identifying no security threat with the prefetched content or receiving from the user a selectable option to ignore the warning, cause display of a second window comprising the prefetched content.

15. The computer-readable storage medium of claim 14, wherein the instructions further comprise:
  instructions to generate but not display the second window;
  instructions to populate the second window with the prefetched content; and
  instructions to cache the second window.

16. A method of enhanced browsing with security scanning, the method comprising:
  identifying, in a first document displayed on a client computing device, a target link to content, wherein the target link is identified by the client computing device from one or more links that are contained within the first document, wherein the one or more links are prioritized by the client computing device to determine a prefetching order based on an appearance of the one or more links within the first document, and wherein the target link is identified and prioritized before a request for the content is sent from the client computing device to a computing device that stores the content;
  prior to receiving a user selection of the target link or of an indicator associated with the target link, prefetching the content which, in addition to a Uniform Resource Locator (URL), includes web page data, applets, or scripts;
  loading the content into a safe cache on the client computing device according to the prefetching order and before receiving a user selection of the target link and before the content is opened by an application configured to provide access to the content on the client computing device; and
  while the content is in the safe cache:
  preventing the content from altering a memory location or storage location external to the safe cache; and
  scanning the content on the client computing device for a security threat.

17. The method of claim 16, further comprising:
  detecting placement of a cursor proximate to the target link or the associated indicator; and
  in response to the detecting:
    in response to identifying a security threat within the content, presenting one or more selectable options to initiate in response to the identified security threat; and
    in response to identifying no security threat within the content or receiving from the user a selectable option to ignore an identified security threat, causing display of a second window comprising the content.

18. The method of claim 16, further comprising:
  before receiving the user selection of the target link or of the associated indicator, displaying an indicator to indicate whether a security threat was detected within the content, wherein said displaying an indicator comprises altering an appearance of the indicator associated with the target link.

19. The method of claim 16, wherein the content contains executable code and said scanning comprises executing the code within the safe cache to determine a behavior of the code.

20. The method of claim 16, wherein the application is a word processing program.

* * * * *